(12) United States Patent
Junginger et al.

(10) Patent No.: US 12,482,306 B2
(45) Date of Patent: Nov. 25, 2025

(54) SYSTEM AND METHOD OF CLEANING FLUID, AND VEHICLE CONNECTED TO THE SYSTEM

(71) Applicant: MANN+HUMMEL GmbH, Ludwigsburg (DE)

(72) Inventors: Bernd Junginger, Stuttgart (DE); Eric Thebault, Ludwigsburg (DE); Alexander Woeber, Ludwigsburg (DE); Vincent Raimbault, Lyons (FR)

(73) Assignee: MANN+HUMMEL GmbH, Ludwigsburg (DE)

( * ) Notice: Subject to any disclaimer, the term of this patent is extended or adjusted under 35 U.S.C. 154(b) by 216 days.

(21) Appl. No.: 18/336,083

(22) Filed: Jun. 16, 2023

(65) Prior Publication Data
US 2023/0419747 A1    Dec. 28, 2023

(30) Foreign Application Priority Data
Jun. 24, 2022   (EP) ..................................... 22305914

(51) Int. Cl.
*G07C 5/00* (2006.01)
*B60S 5/00* (2006.01)
(Continued)

(52) U.S. Cl.
CPC ................ *G07C 5/008* (2013.01); *B60S 5/00* (2013.01); *F01P 11/12* (2013.01); *F01P 11/14* (2013.01);
(Continued)

(58) Field of Classification Search
CPC ...... G07C 5/008; G07C 5/0825; G07C 5/085; G07C 5/10; B60S 5/00; F01P 11/12;
(Continued)

(56) References Cited

U.S. PATENT DOCUMENTS

| | | | |
|---|---|---|---|
| 6,212,882 B1 * | 4/2001 | Greger ................. | B01D 53/944 423/247 |
| 7,261,762 B2 * | 8/2007 | Kang ................. | B01D 46/0086 116/DIG. 25 |

(Continued)

FOREIGN PATENT DOCUMENTS

| | | |
|---|---|---|
| DE | 4345532 B4 | 5/2008 |
| DE | 102017008745 A1 | 3/2018 |

(Continued)

*Primary Examiner* — Tyler D Paige

(57) ABSTRACT

System, vehicle connected to system, and method for cleaning fluid, the system comprising: an air channel comprising an intake and an outlet; a receptacle configured to receive a filter, so that the filter when installed in the receptacle is in the stream of an airflow when air is flowing through the air channel; an airflow control device for influencing a filter airflow which is portion of the airflow that passes the filter; a controlling circuit for controlling the airflow control device in accordance with pre-determined control parameters; and an electronic processing circuit configured to: determine a filter usage value of the filter and store the filter usage value to historical data in a memory, by a microprocessor and based on the historical data, generate adjusted control parameters to drive the airflow control device.

21 Claims, 9 Drawing Sheets

(51) Int. Cl.
*F01P 11/12* (2006.01)
*F01P 11/14* (2006.01)
*G06Q 30/0601* (2023.01)
*G07C 5/08* (2006.01)
*G07C 5/10* (2006.01)

(52) U.S. Cl.
CPC ....... *G06Q 30/0635* (2013.01); *G07C 5/0825* (2013.01); *G07C 5/085* (2013.01); *G07C 5/10* (2013.01)

(58) Field of Classification Search
CPC . F01P 11/14; G06Q 30/0635; B01D 2279/60; B01D 46/0041; B01D 46/0086; B01D 46/4272; B01D 46/429; B01D 46/46; B01D 46/521; B01D 46/42; B01D 46/62; B01D 53/30; B01D 46/0039; B01D 46/44; B01D 2279/40; B60H 3/06; G06N 3/0464; G06N 3/08; G06F 16/909; H04L 67/12; H04L 67/52
USPC ........................................................ 701/29.2
See application file for complete search history.

(56) References Cited

U.S. PATENT DOCUMENTS

| | | | |
|---|---|---|---|
| 7,923,141 B2 | 4/2011 | Okuda et al. | |
| 9,702,577 B1 | 7/2017 | Lachapelle et al. | |
| 11,318,407 B2 * | 5/2022 | Wei | B01D 46/46 |
| 11,642,942 B2 * | 5/2023 | Bauer | B60H 1/00771 |
| | | | 95/1 |
| 11,787,269 B2 * | 10/2023 | Bauer | B60H 3/024 |
| | | | 95/1 |
| 2011/0308308 A1 * | 12/2011 | Herman | F02M 35/0208 |
| | | | 73/114.31 |
| 2015/0333380 A1 | 11/2015 | Minamiura et al. | |
| 2016/0189115 A1 * | 6/2016 | Cattone | G06Q 10/087 |
| | | | 705/26.8 |
| 2017/0132575 A1 * | 5/2017 | Buren | G06Q 10/1095 |
| 2017/0211498 A1 * | 7/2017 | Moore | F02M 35/024 |
| 2018/0037093 A1 | 2/2018 | Newman | |
| 2018/0130267 A1 * | 5/2018 | Jones | G07C 5/008 |
| 2018/0134112 A1 | 5/2018 | Seiferlein et al. | |
| 2018/0202398 A1 * | 7/2018 | Jammoussi | F02M 35/104 |
| 2019/0118140 A1 * | 4/2019 | Fingland | F01P 7/12 |
| 2019/0120744 A1 * | 4/2019 | Ödling | B01D 46/0086 |
| 2019/0363411 A1 | 11/2019 | Takeuchi et al. | |
| 2021/0276398 A1 | 9/2021 | Kazari et al. | |
| 2022/0260031 A1 * | 8/2022 | Li | F02M 35/024 |
| 2023/0191308 A1 * | 6/2023 | Hämmerle | B01D 46/71 |
| | | | 95/15 |
| 2023/0419747 A1 * | 12/2023 | Junginger | G07C 5/10 |

FOREIGN PATENT DOCUMENTS

| | | |
|---|---|---|
| FR | 3076491 A1 | 7/2019 |
| IN | 201941022243 A | 12/2020 |
| WO | 2004047962 A1 | 6/2004 |
| WO | 2019110223 A1 | 6/2019 |

* cited by examiner

SYSTEM AND METHOD OF CLEANING FLUID, AND VEHICLE CONNECTED TO THE SYSTEM

CROSS-REFERENCE TO RELATED APPLICATION

This application claims the benefit under 35 U.S.C. 119(a) of European Application No. 22305914.8 filed on Jun. 24, 2022, in the European Patent Office, the entire disclosure of which is incorporated herein by reference for all purposes.

BACKGROUND

The disclosure relates to a system for cleaning fluid. The disclosure also relates to a vehicle connected to the system. The disclosure further relates a method of cleaning fluid.

Due to progressive urbanization, the problem exists that the ambient air can exceed limit values for particulate matter and/or gases such as ozone, NOx, CO many times over, especially in certain weather conditions (no rain, inversion, low wind speeds, no air exchange between altitudes), as a result of industrial waste gases, road traffic and private fireplaces.

The problem of traffic-related emissions has recently been exacerbated by calls for driving bans for certain groups of vehicles, especially diesel cars, in areas of particularly high air pollution due to their NOx and particular matter emissions. Devices including filters may be used for cleaning air, however when a filter has achieved its full loading capacity, the filtration may no longer be effective, and energy may be wasted by the operation of the device.

It is an objective of the present application to solve such a problem and provide for an improved air cleaning system and method.

SUMMARY

An aspect of the disclosure concerns a system for cleaning fluid. The system for cleaning fluid may include an air channel including an intake and an outlet, for example parts, such as ducts, forming a channel for air flow. The system for cleaning fluid may include a receptacle configured to receive a filter, so that the filter when installed in the receptacle is in the stream of an airflow when air may be flowing through the air channel. The system for cleaning fluid may include an airflow control device for influencing a filter airflow which may be portion of the airflow that passes the filter, for example, a fan, a shutter, a filter bypass, or a combination thereof. The system for cleaning fluid may include a controlling circuit for controlling the airflow control device in accordance with pre-determined control parameters. The system for cleaning fluid may include an electronic processing circuit. The electronic processing circuit may be configured to determine a filter usage value of the filter and store the filter usage value to historical data in a memory. The electronic processing circuit may be configured to, by a microprocessor and based on the historical data, generate adjusted control parameters to drive the airflow control device. The adjusted control parameters are to reduce or increase an average loading rate of the filter, e.g., as compared to the control parameters, such that a pre-determined filter load (e.g., a full filter load) may be achieved within a pre-determined tolerance associated with a pre-determined next maintenance time.

An aspect of the disclosure relates to a vehicle connected to the system for cleaning fluid in accordance with various embodiments. The vehicle may include the air channel, the receptacle, the airflow control device, and the controlling circuit. The vehicle may further include the electronic processing circuit. Alternatively, or in addition, the vehicle may be coupled to the electronic processing circuit, which may, e.g., not be part of the vehicle. For example, the electronic circuit may be included in a remote server, or the electronic circuit may be included on board of the vehicle (such as a mobile phone), or further, the electronic circuit may be distributed between the server and the vehicle, being realized in part in a remote server and in part on the vehicle, e.g. as edge processing. An example of a server is a cloud.

An aspect of the disclosure relates to a method of cleaning fluid with a filter. The method may include providing an airflow through the filter. The method may include by an airflow control device in accordance with various embodiments, controlling an airflow through a filter. For example, controlling may be performed by controlling a fan, a shutter, a filter bypass, or a combination thereof. The method may further include by a controlling circuit, controlling the airflow control device in accordance with pre-determined control parameters. The method may further include by an electronic processing circuit, determining a filter usage value of the filter and store the filter usage value to historical data in a memory. The method may further include by a microprocessor, generating, based on the historical data, adjusted control parameters to drive the airflow control device. The adjusted control parameters may be different from the pre-determined control parameters. The adjusted control parameters are to reduce or increase an average loading rate of the filter (e.g., as compared to the control parameters) such that a pre-determined filter load (e.g., a full filter load) may be achieved within a pre-determined tolerance associated with a pre-determined next maintenance time.

According to some embodiments, the method of cleaning fluid of any one of the previous claims, may further include: by the electronic processing circuit, determining an end-of-life time of the filter. The method may include, by an ordering subsystem of the system, selecting one or more potential maintenance locations from a locations database. The method may include, by the ordering subsystem of the system, requesting operating time data from the locations database. The method may include, by the ordering subsystem of the system, requesting availability of a replacement filter data from a location's server or from the locations database. The method may include, by the ordering subsystem of the system, determining one or more positive maintenance locations as being the one or more potential maintenance locations in which the replacement filter may be available. The method may include, by the ordering subsystem of the system, providing a message including the positive maintenance locations on a user interface (e.g., display on a map, display on a list or audio list), and receiving a user input for selecting a maintenance location. The method may include, by the ordering subsystem of the system, adding filter reservation information to a database associated with the selected maintenance location, indicating that the filter is to be reserved, or is reserved.

According to some embodiments, the method of cleaning fluid in accordance with various embodiments may further include by the electronic processing circuit, determining an end-of-life time of the filter. The method may further include, optionally by the ordering subsystem, selecting one or more potential maintenance locations from a locations database. The method may further include, optionally by the ordering subsystem, requesting operating time data from the locations database. The method may further include, optionally by the ordering subsystem, requesting availability of a replacement filter data from a location's server or from the locations database. The method may further include, optionally by the ordering subsystem, determining that there are potential maintenance locations in which the replacement filter may be not available. The method may further include, optionally by the ordering subsystem, estimating a delivering time for potential maintenance locations in which the replacement filter may be not available according to a pre-determined historical database and/or stock data from a stock database. The method may further include, optionally by the ordering subsystem, determining a set of one or more positive maintenance locations, including the one or more potential maintenance locations for which the filter replacement may be orderable within a tolerance of the end-of-life time of the filter. The method may further include, optionally by the ordering subsystem, providing a message including the positive maintenance locations on a user interface (e.g., display on a map, display on a list or audio list). The method may further include, receiving a user input for selecting a maintenance location. The method may further include, optionally by the ordering subsystem, ordering the filter to the maintenance location, for example, by preparing an order dataset for an order of the replacement filter for replacing filter including replacement filter model and the pre-determined next maintenance time; and sending the order data to an order receiver communication interface. The method may further include, optionally by the ordering subsystem, use the estimate arrival time added by the tolerance as the pre-determined next maintenance time.

According to some embodiments, the filter usage value may be a filter loading. To determine a filter usage value and store to historical data may include determine a filter loading of the filter based on usage data and/or sensor data, and may further include store the filter loading to historical data in a memory. To change, increase, decrease, or optimize filter usage refers to future use of the filter and may mean to change, increase, decrease, or optimize filtration.

According to some embodiments, the electronic processing circuit may be further configured to, in an automatic mode, provide the adjusted control parameters to the controlling circuit for controlling the airflow control device.

According to some embodiments, the system for cleaning fluid may further include a setup unit configured to receive a mode data including indicative of the automatic mode, for example from a user selection carried out on a user interface. The setup unit may be further configured to store the mode data in memory for use by the electronic processing circuit. In examples the user interface may be implemented on a car interface and/or on a mobile phone interface, such as display and buttons. Buttons may be integrated in a display which may be a touch screen.

As used herein and in accordance with various embodiments, an end-of-life time of the filter may be determined based on the historical data. In one example, the end-of-life time of the filter is when the filter has reached the pre-determined filter load, e.g., a full nominal load. A full nominal load may be a full load, or a full load less a buffer, e.g., 95% of full load, thereby leaving a loading buffer (e.g., 5%). In non-limiting examples, the buffer may be selected from a range of 1% to 15%. In examples, the determination may be performed, by extrapolation based on one or more time from first use, current time, current loading (relative), filter parameters, current filter loading.

According to some embodiments, the electronic processing circuit may be configured to determine an end-of-life time of the filter based on the historical data. In one example, the end-of-life time of the filter is when the filter has reached the pre-determined filter load, e.g., a full nominal load A full nominal load may be a full load, or a full load less a buffer, e.g., 95% of full load, thereby leaving a loading buffer (e.g., 5%). In non-limiting examples, the buffer may be selected from a range of 1% to 15%. In examples, the determination may be performed, by extrapolation based on one or more time from first use, current time, current loading (relative), filter parameters, current filter loading. In an example the determination may be performed by a trained neural network, which is trained on historical data.

According to some embodiments, the electronic processing circuit may be configured to compare the end-of-life time to a pre-determined next maintenance time.

According to some embodiments, the electronic processing circuit may be configured to check whether the end-of-life time is before the pre-determined next maintenance time. According to some embodiments, the electronic processing circuit may be configured to, if the end-of-life time is before the pre-determined next maintenance time, determine, based on the historical data, a reduction in filter usage. Alternatively or in addition, according to various embodiments, the electronic processing circuit may be configured to, check whether the end-of-life time is after the pre-determined next maintenance time. According to some embodiments, the electronic processing circuit may be configured to, if the end-of-life time is after the pre-determined next maintenance time, determine, based on the historical data, an increase in filter usage, such as increased airflow, necessary to extend a remaining life of the filter such that the end-of-life time occurs within the pre-determined tolerance of a pre-determined next maintenance time.

According to some embodiments, the reduction in filter usage may include a decreased airflow. The reduction in filter usage may include to extend a remaining life of the filter such that the end-of-life time occurs within the pre-determined tolerance of a pre-determined next maintenance time. The increase in filter usage may include an increased airflow. The increase in filter usage may include to reduce a remaining life of the filter such that the end-of-life time occurs within the pre-determined tolerance of a pre-determined next maintenance time. The pre-determined tolerance may have a time unit (or be a fraction or a percentage) and may be a tolerance of the next pre-determined maintenance time, alternatively or in addition, the pre-determined tolerance may be a loading capacity tolerance (buffer) of the filter and may have the units of mass, or be a fraction or a percentage. The pre-determined tolerance may be estimated based on a historical deviation of a should maintenance time to an is maintenance time, as it is collected in a historical database for a large number of vehicles, e.g., 100 or more vehicles, each having at least one maintenance appointment. Alternatively, or in addition the pre-determined tolerance may be estimated based on the loading buffer of the filter. In another alternative, the pre-determined tolerance may be a fixed time period, e.g. 5 days. According to various embodiments, determining if the filter will achieve the pre-determined filter load at the next maintenance time may include a loading capacity tolerance, for example, a plus and minus tolerance chosen from a range of smaller or equal than 10% or smaller and equal than 5%, e.g., +/−10%, +/−7%. Alternatively, or in addition, the tolerance may be on the next maintenance time, for example a plus and minus tolerance chosen from a range of smaller or equal than 15 days, smaller and equal than 10 days, or smaller and equal than 5 days, e.g., +/−10 days, +/−7 days. Alternatively, or in addition, the tolerance may be on a mileage, for example a plus and minus tolerance chosen from a range of smaller or equal than 3000 km, smaller and equal than 1000 km, e.g., +/−1000 km.

According to various embodiments, the electronic processing circuit may be operably couplable to a user interface including a display for displaying filter load information. Examples of information to be displayed are selected from one or more of current load, current life time, end-of-life time estimation, prediction of an end-of-life time. The user interface may include buttons, the buttons may be virtual, physical, or a mixture thereof. The user interface is configured such that a user, based on the filter load information, may request a change in the control parameters.

According to various embodiments, a filter load information may be displayed on the display and may include one or more of: the filter usage time, a filter loading time, remaining filter capacity time, filter load, or remaining filter load capacity. The filter loading time may be linearized for easier to follow, for example loading regions in which the filter loads faster may be expanded, and/or loading regions in which the filter loads slower may be compressed. Thereby a user can see a linear, e.g., a single progress bar of the filter, a numeric percentual, a plot, and/or another form or graphic, which is easier to read. For example, filter loading may be non-linear (e.g., may start being electrically load, such as a negative load) and therefore have a higher filtration performance in the beginning as compared to an electrically neutral filter, thus for human comparison, a linearization may ease the reading of the information, for example side by side as a single progress bar of the filter, a numeric percentual, a plot, and/or another form or graphic.

According to some embodiments, the controlling circuit and the electronic processing circuit are integrated in a single control unit, for example in an engine control unit (ECU).

According to some embodiments, the controlling circuit and the electronic processing circuit may be physically separate from each other. The controlling circuit comprises or may be connected to a data communication interface. The data communication interface may be configured to connect to a server. In some embodiments, the server may include the electronic processing unit. In one example, the server may be a cloud.

According to various embodiments, the electronic processing circuit may be configured to determine an end-of-life time of the filter. The system may further include an ordering subsystem. The ordering subsystem may be configured to select one or more potential maintenance locations from a locations database. The ordering subsystem may be configured to request operating time data from the locations database. The ordering subsystem may be configured to request availability of a replacement filter data from a location's server or from the locations database. The ordering subsystem may be configured to determine whether there are potential maintenance locations in which the replacement filter may be not available; and further to estimate a delivering time for potential maintenance locations in which the replacement filter may be not available according to a pre-determined historical database and/or stock data from a stock database. The ordering subsystem may be configured to determine a set of one or more positive maintenance locations. The set of one or more positive maintenance locations may include the one or more potential maintenance locations for which the filter replacement may be available, and may further include the one or more potential maintenance locations for which the filter replacement may be orderable within a tolerance of the end-of-life time of the filter. The ordering subsystem may be configured to provide a message including the positive maintenance locations on a user interface. The ordering subsystem may be configured to receive a user input for selecting a maintenance location. For example, a message may be in the form of displaying locations on a map, display a list of locations, a sound message including the list of locations.

The ordering subsystem may be configured to determine whether a maintenance location selected by the user is a location for which the filter replacement is orderable. The ordering subsystem may be configured to, if the maintenance location selected by the user is one of the one or more potential maintenance locations for which the filter replacement may be orderable, order the filter to the maintenance location. Order the filter may include preparing an order dataset for an order of the replacement filter for replacing filter including replacement filter model and the pre-determined next maintenance time. Order the filter may include sending the order data to an order receiver communication interface. The ordering subsystem may be configured to use the estimate arrival time added by the tolerance as the pre-determined next maintenance time.

DETAILED DESCRIPTION

Figure 1:
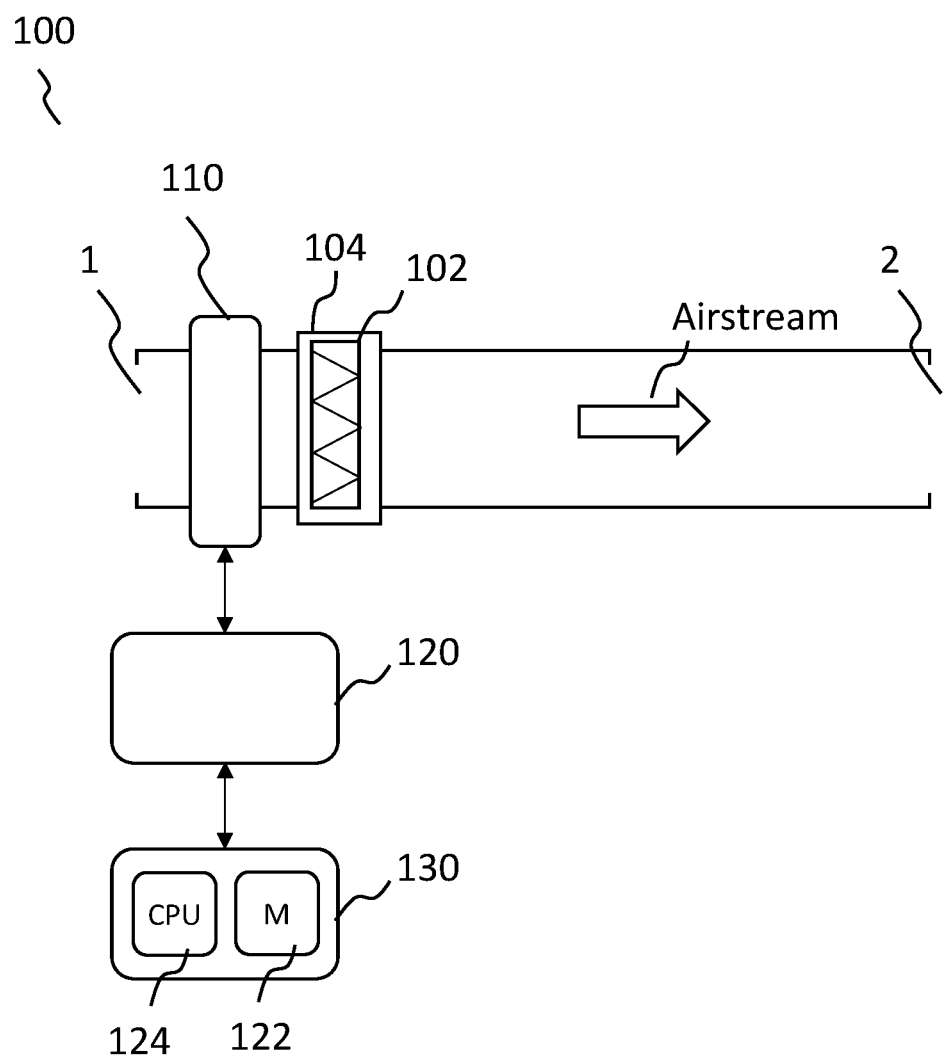
FIG. 1 shows a schematic of a system 100 for cleaning fluid in accordance with various embodiments.

According to various embodiments, cleaning air may include the meaning of removing particulate matter from air.

According to various embodiments, the filter may be a particle filter, for example, to filter out (not let pass thought) PM10 particles and above, PM2.5 particles and above, or PM1 particles and above. The filter may be a fine dust filter.

According to some embodiments, the filter has at least one filter element which may include at least one filter medium which may be folded into at least one filter bellows. The filter may include a plurality of fold stabilizing means which support the filter bellows and are present at a lateral distance of e.g., not more than 150 mm from one another, and for example at least 15 mm from one another, for example 70 mm. It may be provided that the filter medium has an intrinsic bending stiffness of at least 1 Nm$^2$, for example, at least 2 Nm$^2$. This refers to an intrinsic bending stiffness of the filter medium, i.e. in an unprocessed/unfolded state. The filter may comprise pleat stabilizing means. The system may comprise one water separating device.

According to some embodiments, the depth of the filter element in the longitudinal direction of the vehicle may be less than 150 mm, for example less than 110 mm. The depth is preferably not be less than 15 mm, since otherwise the usable filter area would be very low. In one embodiment of the application, the dimensions of an inflow surface of the ambient air purification device may be, for example, 45 cm (height)×65 cm (width) for a typical mid-size passenger car. Depending on the size of the vehicle, however, significant deviations from this are possible, so that a range of dimensions from 20 cm in width to 120 cm in width and 15 cm in height to 100 cm in height are possible in principle.

According to some embodiments, the filter medium of the filter element may be a single-layer or multi-layer filter medium, which may be water-resistant. It may be a multi-layer medium comprising at least one drainage layer and/or one pre-separator layer. Alternatively or additionally, the filter medium may comprise or consist of glass fibers and/or plastic fibers, in particular polyester and/or polyethylene. Finally, it may also be provided that the filter medium has a porosity gradient in a thickness direction, preferably in such a way that a pore size decreases in the direction of airflow.

Depending on the design of the filter element (volume flow pressure loss characteristic), it can be achieved in conjunction with the fan that the fine dust emissions of the vehicle are completely compensated by the ambient air cleaning device, so that it is a zero-emission vehicle in terms of dust, e.g., in terms of PM10, PM2.5, or PM1. For a typical medium-class passenger car, the total particulate matter emission is about 25 mg/km.

The filter may include a filter frame, for example, at least partially circumferential frame in which the filter element (e.g., filter bellows) is accommodated. In an example, it may be provided that the frame has an L-shaped cross-sectional form, e.g., wherein one leg of the L-shaped cross-section of the frame engages behind the filter bellows of the filter element, and thus supports it counter to the effect of dynamic pressure. The filter may comprise two or more filter elements, and the filter elements may be arranged in (e.g., fixed to) a single filter frame, or alternatively, each filter element may be arranged in a separate frame element of a filter frame.

The filter element may in particular comprise or be a plastic-molded filter element, wherein the at least partially circumferential frame may be connected to the filter medium by a material-to-material bond. However, the invention is not limited to a material connection; as an alternative to the material connection of the filter medium to the frame, it may also be provided that the filter element is merely inserted into the frame, so that it is supported in a form-fitting manner on the rear leg of the L-profile.

According to some embodiments, the term receptacle may mean a means for cooperating with the filter to keep the filter in place, for example, but not limited to, a holder, a frame, and/or a clip, or an air channel housing. The filter may be arranged (and arrangeable) into the receptacle. The receptacle may be fixed to the vehicle and may corresponds to the frame of the filter, in which the filter is held, optionally by detachable fastening means, e.g., a clip connection. The receptacle may further be configured to function as a mounting shaft, into which the at least one filter element may be linearly inserted. This makes it easy to replace the filter element, for example from the upper side of a lock carrier of a front hood or from an underbody side which is easily accessible, for example, during servicing on a lifting platform.

FIG. 1 shows a schematic of a system 100 for cleaning fluid in accordance with various embodiments. The system 100 may include an air channel comprising an intake 1 and an outlet 2, for example the air channel may include a duct, or more than one duct parts, coupled to the receptacle 104. The system may include a receptacle 104 configured to receive a filter 102, so that the filter 102 when installed in the receptacle 104 is in the stream of an airflow when air is flowing through the air channel. The system may include an airflow control device 110 for influencing a filter airflow which is portion of the airflow that passes the filter, for example the air flow system may include a shutter, a filter bypass, a fan, or two or more thereof. In one example, the system may include shutter upstream from the filter 102, a bypass parallel to the filter, and/or a fan downstream of the filter 102.

As used herein and in accordance with various embodiments the terms downstream and upstream are relate to airflow of the airstream, e.g., when air flows from an air intake of the vehicle to an air outlet, then the air intake is upstream from the outlet.

The system 100 may further include a controlling circuit 120 for controlling the airflow control device in accordance with pre-determined control parameters. The system 100 may further include an electronic processing circuit 130. The electronic processing circuit 130 may be configured to determine a filter usage value of the filter 102 and store the filter usage value to historical data in a memory 122. The electronic processing circuit 130 may be configured to, e.g., by a microprocessor 124, and based on the historical data, generate adjusted control parameters to drive the airflow control device 110. The adjusted control parameters are to reduce or increase an average loading rate of the filter 102, e.g., as compared to the control parameters, such that a pre-determined filter load is achieved within the pre-determined tolerance of a pre-determined next maintenance time. The electronic processing circuit 130 may include a memory 122, which may store historical data, the generated adjusted control parameters, or both.

According to various embodiments, the electronic processing circuit 130 may be located onboard of the vehicle, e.g., an ECU. Alternatively, or in addition, the electronic processing circuit 130 may be provided by an external service external to the vehicle, for example a server or a cloud.

In accordance with various embodiments, to determine a filter usage value and store to historical data may include to determine a filter loading of the filter 102 based on usage data and/or sensor data, and may further include store the filter loading to historical data in a memory 122. According to various embodiments, the filter usage value may be a filter loading. As used herein and in accordance with various embodiments, historical data may mean data collected in connection with the usage of a filter, e.g., from a first usage after insertion of a fresh filter until a last time that the filter has been used. Non-limiting examples of such data may be: air speed, air flow, air flux, air temperature, pressure upstream of filter, pressure downstream of filter, pressure differential (of both sides of the filter), a derived quantity thereof, or a combination thereof.

According to various embodiments, data in vehicle's memory may be stored continuously or periodically. Data in vehicle's memory may be read continuously or periodically. A memory may be a memory physically encapsulated or monolithic to a microcontroller, or on a separate chip.

Data as used herein and in accordance with various embodiments, may be indicative of a value, for example, a measured value, a status, a counter, a time stamp, or others. Obtaining data and obtaining the value indicated by the data may be used herein interchangeably.

According to various embodiments, different methods may be used to determine filter loading of the filter. For example, a measured set of parameters can be mapped to a calibrated database comprising calibration data to determine a current filter loading, e.g., as a percentual having 100% as the pre-determined filter loading (e.g., fully loaded filter, or full nominal load). Other methods of performing mass load estimation for an air filter are known to the skilled person in the art. An initial state of a filter may be of a new filter, for example an unloaded filter. In some embodiments, the initial state of a filter may be a new filter which is electrostatically loaded.

According to various embodiments, historical data of many filters may be used for generating calibration data to determine filter loading of the filter. For example, such calibration data may be separated by filter type, filter media and geometry (e.g., area, pleat geometry, etc). Thereby, a calibration data specific to the type of filter in use can be used to determine filter loading of the filter.

For example, a pressure differential (dp) between both sides of the filter may be measured and an air speed (S) of air may be provided, and in the calibration, data having axis dp, S, and filter load(L), for the same filter type, the filter load (L) may be read. Instead of air speed (S), a volume flow (VF), a mass flow (MF), or a flux (j) may be used, for example as measured, or calculated.

In another example, the filter loading may be determined by adding (i) measurements each of a filtered amount of particles measured during interval time ($\Delta t_i$). The filtered amount of particles may be calculated, e.g., by multiplying an air flow ($Q(t_i)$) by the particulate concentration ($P(t_i)$) (e.g., PM10 concentration) and the efficiency of the filter media (n) as shown in the exemplary formula below but not limited thereto. The airflow ($Q(t_i)$) may be estimated by the air speed in front of the filter multiplied by the projected element area and/or an airflow provided by a blower. The airflow $Q(t_i)$ may be volumetric air flow and the concentration $P(t_i)$ may be the mass of particles per volume of air. In one example, the air speed in front of the filter media may be calculated by a fraction of a vehicle's speed, for example, vehicle speed divided by 3.

$$M_T = \Sigma_{i=1}^{i=m} Q(t_i) \cdot P(t_i) \cdot n \cdot \Delta t_i$$

While filter load may be measured using a pressure differential sensor (measuring a pressure difference upstream and downstream the filter), such sensors are costly. Thus, for system comprising a filter in stream with a radiator, other methods may be used, for example measuring a filter load by the air cooling efficiency, e.g., by measuring a time for cooling of an internal combustion engine, or a time for charging a battery which requires cooling (e.g., thermal management of the battery will ensure that charging is slower if a pre-determined temperature is reached). Surprisingly, this method allows for measuring filter load even when the vehicle is not moving, e.g., at the relatively lower pressure differentials generated by the fan, lower as opposed as pressures obtained on a highway. Thus, a pressure measurement may not be necessary.

According to some embodiments, a method for calculating a filter load estimation in a vehicle including the system for air cleaning also effecting as a front-end air cooling system including a heat radiator and a filter in an airstream when air is flowing, the heat radiator for cooling coolant fluid, the coolant fluid for transporting heat from a part of the vehicle (e.g., from the internal combustion engine, electrical engine or fuel cell) to the heat radiator. The method may include obtaining, from a computer memory of the vehicle cooling fluid temperature data representing the cooling fluid temperature. The method may include obtaining, (e.g., from a computer memory of the vehicle) an exterior air temperature. The method may include determining that the vehicle is not moving (e.g., the engine is off or working in stand-by). The method may include providing, with a fan, air flow through the heat radiator and the filter, wherein the filter is positioned in series of the radiator. The method may include determining that the fan is operating, and may further include acquiring the fan speed. The method may include based on the cooling fluid temperature, the charging power, and the exterior temperature calculating (e.g., with a microprocessor) the filter load estimation. The filter load estimation is also named a cooling based load estimation. The filter load estimation may be further calculated based on a fan parameter, such as fan speed, e.g., fan angular frequency in rpm or Hz. Alternatively, or in addition, the fan speed may also be a pre-determined nominal speed and the filter load estimation may be calculated only when the fan is operating in the pre-determined nominal speed.

According to various embodiments, the electronic processing circuit 130 may be configured to, in an automatic mode, provide the adjusted control parameters to the controlling circuit 120 for controlling the airflow control device 110.

Figure 2:
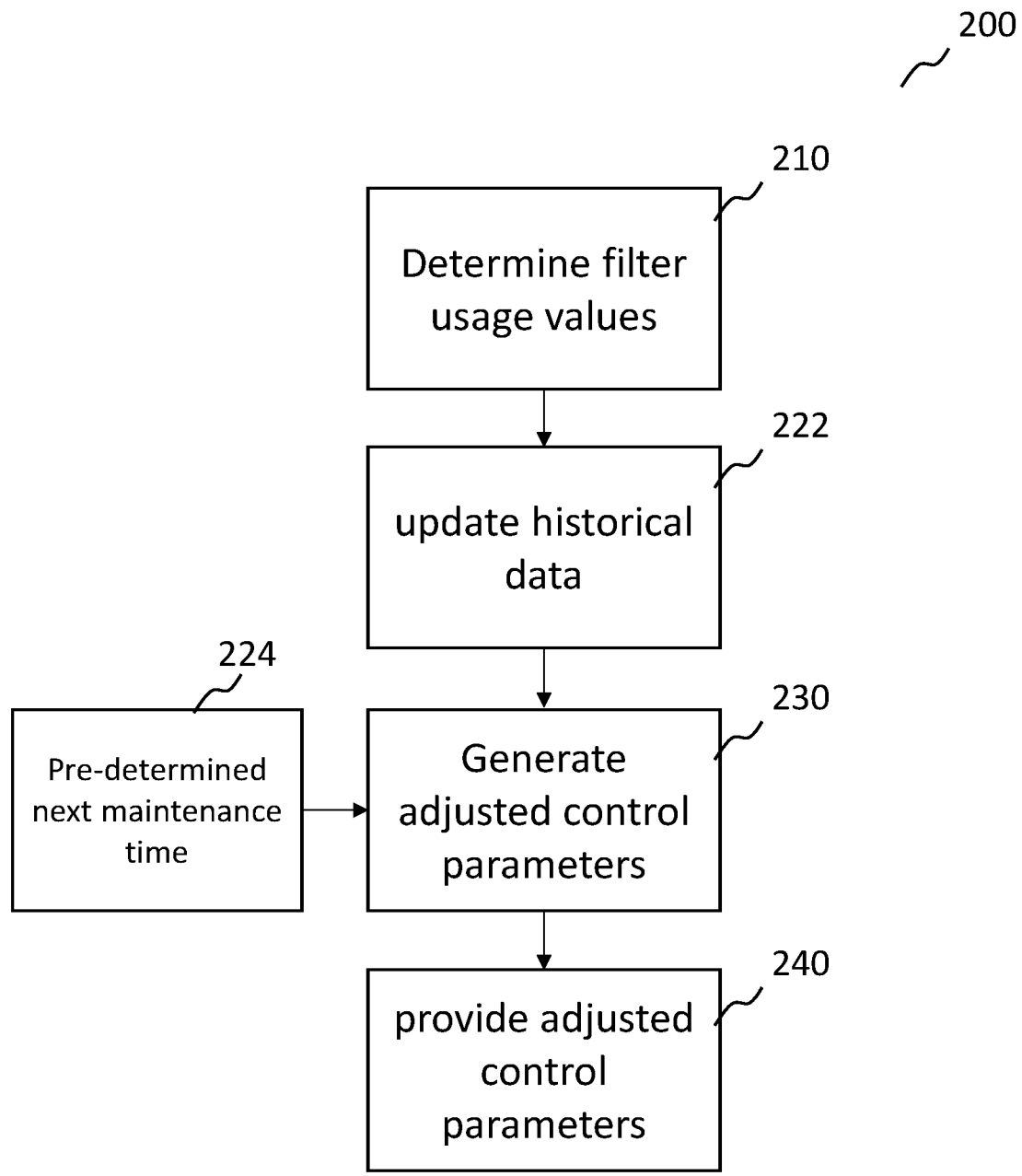
FIG. 2 shows an exemplary method 200 in accordance with various embodiments.

FIG. 2 shows an exemplary method 200 in accordance with various embodiments, for which the system 100 may be configured to. The method 200 of cleaning fluid with a filter 102 may include providing an airflow through the filter 102. The method 200 may include, by an airflow control device 110, controlling an airflow through a filter 102. In examples, a fan, a shutter, a filter bypass, or a combination thereof may be used for controlling the airflow. The method 200 may include, by a controlling circuit 120, controlling the airflow control device 110 in accordance with pre-determined control parameters. The method 200 may include, by an electronic processing circuit 130, determining 210 a filter usage value of the filter 102 and may further include storing 222 the filter usage value to historical data in a memory, for example, in a memory 122 which may be local or external to the vehicle. The method 200 may further include, by a microprocessor 124, generating 230, based on the historical data, adjusted control parameters to drive the airflow control device 110 different from the pre-determined control parameters. The adjusted control parameters are to reduce or increase an average loading rate of the filter 102, as compared to the control parameters (meaning the current control parameters), such that a pre-determined filter load is achieved within the pre-determined tolerance of a pre-determined next maintenance time. The generating may further take as input 224 a pre-determined next maintenance time, for generating the adjusted control parameters. The method 200 may further include providing 240 the adjusted control parameters the airflow control device 110.

Figure 3:
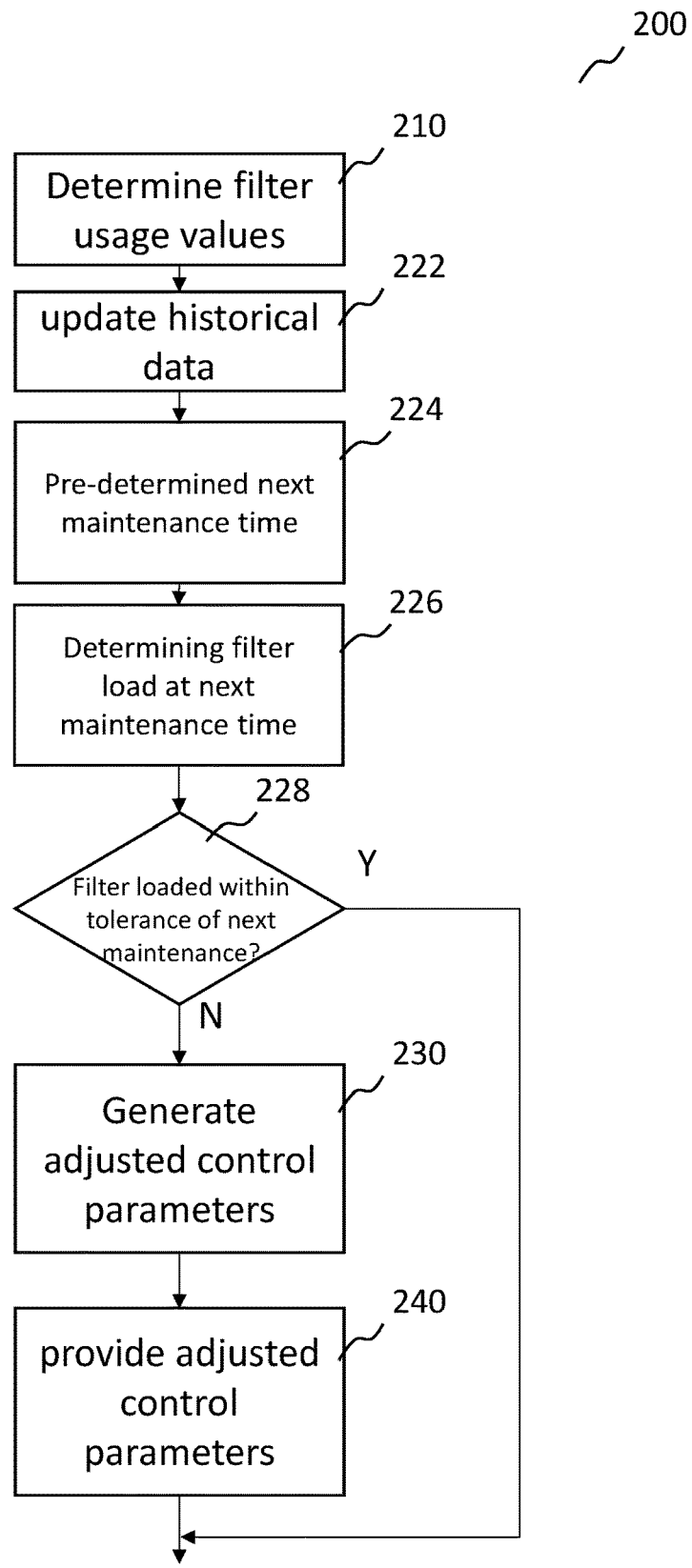
FIG. 3 shows another exemplary method 200 in accordance with various embodiments.

FIG. 3 shows another exemplary method 200 in accordance with various embodiments, for which the system 100 may be configured to. The method 200 of cleaning fluid with a filter 102 may include providing an airflow through the filter 102. The method 200 may include, by an airflow control device 110, controlling an airflow through a filter 102. In examples, a fan, a shutter, a filter bypass, or a combination thereof may be used for controlling the airflow. The method 200 may include, by a controlling circuit 120, controlling the airflow control device 110 in accordance with pre-determined control parameters. The method 200 may include, by an electronic processing circuit 130, determining 210 a filter usage value of the filter 102 and may further include storing 222 the filter usage value to historical data in a memory, for example, in a memory 122 which may be local or external to the vehicle. The method 200 may further include, providing 224 the pre-determined next maintenance time, step 224 may be at any position before decision step 228. The provision 224 of the pre-determined next maintenance time may be selected, without limitation, from read from memory (e.g., memory 122), obtaining via a communication device from an external service or database, obtaining from a user input device, or a combination thereof. The method 200 may further include (e.g. by a microprocessor 124) determining 226 filter load at the next maintenance time. The method may further include, determining 228 if the filter is has reached the pre-determined loading at the next maintenance time, which may include the tolerance. If determine that the filter full load will be achieved out of the tolerance, the method 200 may further include, by a microprocessor 124, generating 230, based on the historical data, adjusted control parameters to drive the airflow control device 110 different from the pre-determined control parameters. The adjusted control parameters are to reduce or increase an average loading rate of the filter 102, as compared to the control parameters (meaning the current control parameters), such that a pre-determined filter load is achieved within the pre-determined tolerance of the pre-determined next maintenance time. The generating may further take as input the pre-determined next maintenance time, for generating the adjusted control parameters. The method 200 may further include provide the adjusted control parameters the airflow control device 110.

Figure 4:
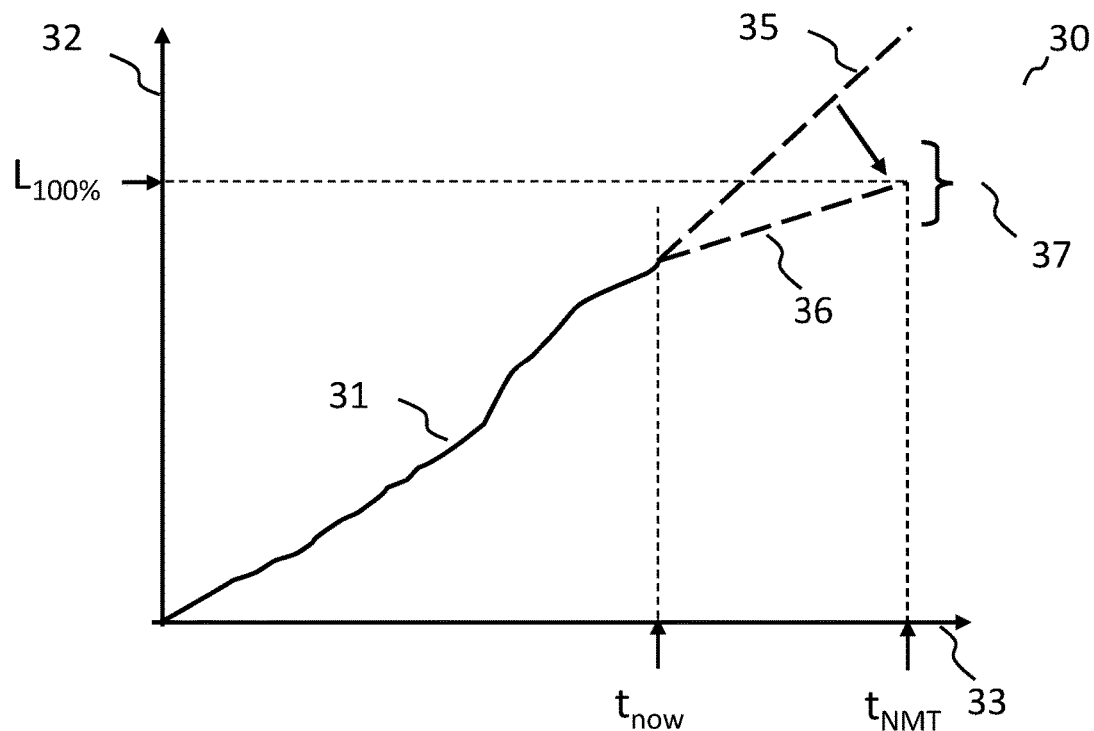
FIG. 4 shows a schematic graph 30 used as example for illustrating the method in accordance with various embodiments.

FIG. 4 shows a schematic graph 30 used as example for illustrating the method in accordance with various embodiments. Graph 30 has a vertical axis representing loading 32 of the filter 102 and a horizontal axis representing time 33 of filter operation of filter 102. The plot 31 represents measured data of filter loading between an initial time and a current time tnow, which is stored as historical data of the filter 102 and is used to determine an estimate of the filter loading at the next pre-determined maintenance date tNMT. For example, the historical data may be fitted with a model, or input into a trained machine learning model for estimating the loading at tNMT. Estimation may also be as to when the filter is 100% loaded and an inter- or extrapolation may be used to estimate the filter loading at the next pre-determined maintenance date tNMT. For example, the estimation indicate that the filter will has reached the pre-determined filter load (L100%) much before the next pre-determined maintenance date tNMT as shown by dashed line 35. The method may further include generating, based on the historical data, adjusted control parameters which are such that the full loading (L100%) of the filter 102 is achieved at or about next pre-determined maintenance date tNMT. In the example, the adjusted control parameters are to drive the airflow control device 110 to reduce filter usage, for example by reducing air flow by at least partially closing a shutter. Therefore, the estimated filter loading plot 35 (dashed line) is reduced in slope to dashed line 36. Other methods of control could be employed, for example the shutter may be fully closed and only open intermittently, or other shutter control profiles may be employed. Also a bypass and/or fan control may be used alternatively or in addition to a shutter. Range 37 indicates that the full loading of the filter may have a tolerance (e.g., a loading capacity buffer), alternatively or in addition, the tolerance may be used as a time tolerance in connection to tNMT.

Figure 5A:
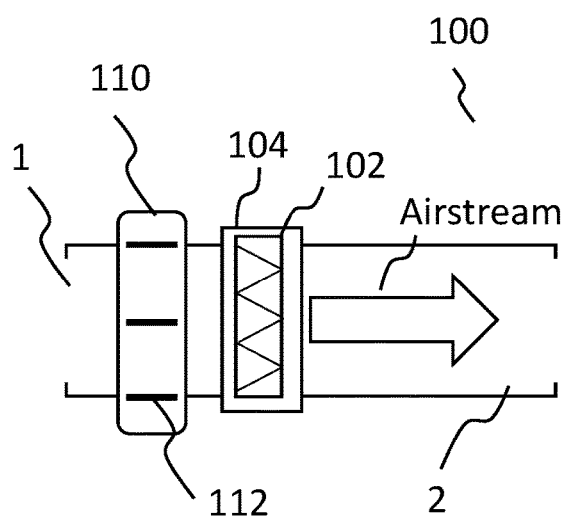
FIGS. 5A and 5B show a schematic of a system 100 for cleaning fluid in accordance with various embodiments.
Figure 5B:
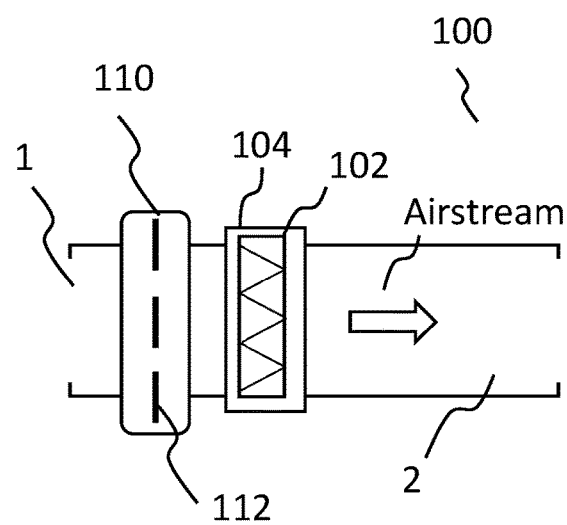

The example with a shutter is shown in connection with FIGS. 5A and 5B. FIGS. 5A and 5B show a schematic of a system 100 for cleaning fluid in accordance with various embodiments. The system 100 may include an air channel comprising an intake 1 and an outlet 2, for example the air channel may include a duct, or more than one duct parts, coupled to the receptacle 104. The system includes a receptacle 104 comprising a filter 102, so that the filter 102 is in the stream of an airflow when air is flowing through the air channel. The system may include an airflow control device 110 for influencing a filter airflow which is portion of the airflow that passes the filter, for illustration purposes and not limiting, a shutter 110 is shown. In the example, the shutter 110 was open from the initial time until tnow. (see FIG. 5A, and shutter blades 112). After tnow, the filter's remaining life has to be stretched so that it does not become the pre-determined filter load (e.g. fully loaded) before the next maintenance tile tNMT and therefore, filter usage is reduced by the adjusted control parameters. The adjusted control parameters may control the shutter to at least partially close, as seen in the shutter blades 112 in FIG. 5B, so to reduce the air flow and the filter usage.

According to various embodiments, the electronic processing circuit 130 may be configured to determine an end-of-life time of the filter (time at when the filter is estimated to have achieved the pre-determined filter load) based on the historical data and compare the end-of-life time to a pre-determined next maintenance time. The system may be configured to if the end-of-life time is before the pre-determined next maintenance time, determine, based on the historical data, a reduction in filter usage, such as decreased airflow, necessary to extend a remaining life of the filter such that the end-of-life time occurs within the pre-determined tolerance associated with a pre-determined next maintenance time. Alternatively, or in addition, the system may be configured to if the end-of-life time is after the pre-determined next maintenance time, determine, based on the historical data, an increase in filter usage, such as increased airflow, necessary to extend a remaining life of the filter such that the end-of-life time occurs within the pre-determined tolerance of a pre-determined next maintenance time.

Figure 6:
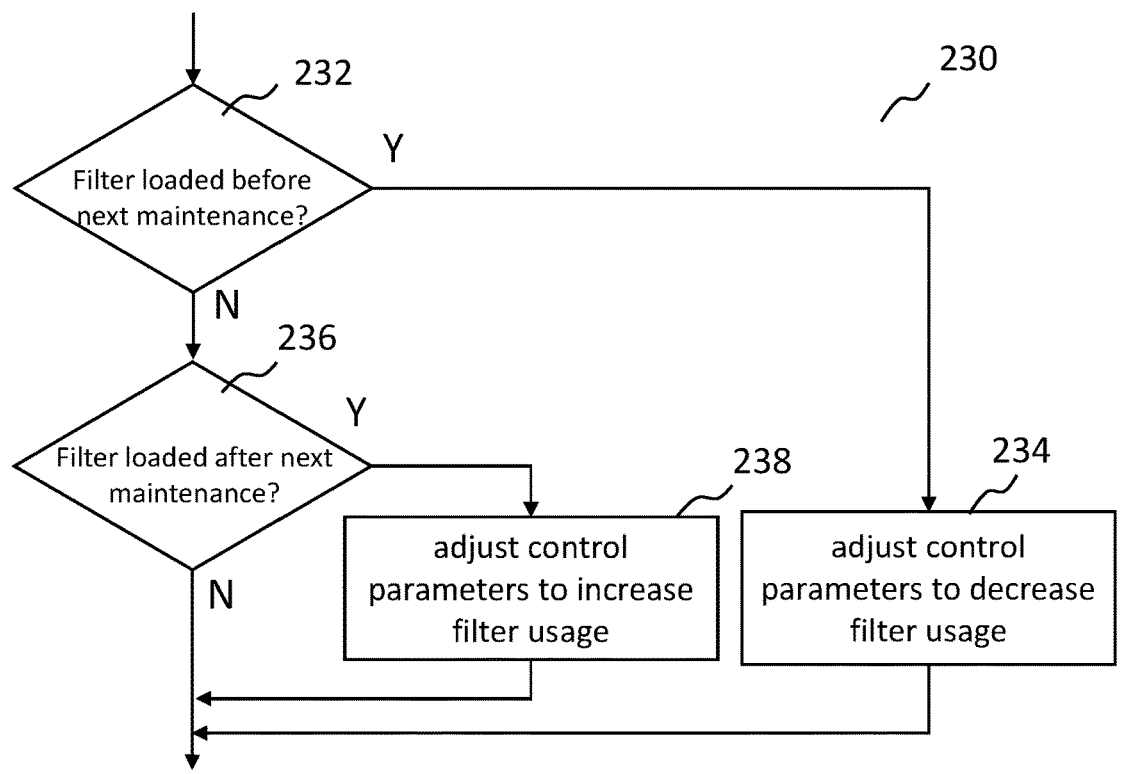
FIG. 6 shows an exemplary method in accordance with some embodiments.

FIG. 6 shows an exemplary method in accordance with some embodiments. The method may include, generating 230, based on the historical data, adjusted control parameters to drive the airflow control device 110. For example, the method may include determining 232 whether the filter will have achieved the pre-determined filter load (e.g., be fully loaded) before the next maintenance time, e.g., before the next maintenance time and outside a tolerance. If the result of the determination is Yes then the method may proceed to adjust 234 the control parameters to decrease filter usage, for example, to decrease filter usage to a rate so that the filter achieves the pre-determined filter load at the next maintenance time, or within a tolerance thereto. If the result is No, the method may proceed to determining 236 whether the filter will achieve the pre-determined filter load after the next maintenance time, e.g., after the next maintenance time and outside a tolerance. If the result of the determination is Yes then the method may proceed to adjust 238 the control parameters to increase filter usage, for example, to decrease filter usage to a rate so that the filter achieves the pre-determined filter load at the next maintenance time, or within a tolerance thereto. Determinations 232 and 236 may use as input the pre-determined next maintenance time, and the estimated end-of-life of the filter 102. Determinations 232 and 236 may be checked in reverse order, or in some embodiments, the method may include only one of the determinations and respective adjustment. After adjusting 234, 238 the control parameters, the method may proceed to providing 240 the adjusted control parameters the airflow control device 110. Determination 228, as shown in FIG. 3 may also be skipped as the result is integrated into determinations 232 and 236, or may be kept in addition, e.g., for a faster processing.

The adjusted control parameters are to reduce or increase an average loading rate of the filter 102, as compared to the control parameters (meaning the current control parameters), such that a pre-determined filter load is achieved within the pre-determined tolerance associated with a pre-determined next maintenance time. The generating may further take as input 224 a pre-determined next maintenance time, for generating the adjusted control parameters. Increased filter usage may decrease a net emission of the vehicle, avoid replacing a filter that is not fully utilized and improve overall sustainability.

According to various embodiments, the method 200 may further include a regulatory check step, wherein, before adjusting control parameters to decrease filter usage, it is determined whether decreased filter usage is allowed, e.g., by comparing the result net emissions and/or the decreased filter usage against a regulatory data stored in memory. The system may be configured accordingly.

According to various embodiments, the controlling circuit may be further configured to determine if environmental air requires cleaning, and may be further configured to, when it is determined that environmental air requires cleaning, operate the fan when a vehicle speed is within a speed range of fan influence, this may optimize airflow at low speeds, and maximizing filtering. The controlling circuit may be configured to not operate the fan when a vehicle speed is out of the speed range of fan influence. Thereby power wasting and associated additional pollutant emission may be prevented.

For example, to determine that air requires cleaning it may be determined that air is polluted, or it may be determined that air is polluted and the location is an area requiring air cleaning (e.g. an urban area). In contrast, a determination that air is polluted but the location is an area not requiring air cleaning (e.g., country side, non-urban area) would not require cleaning. In some embodiments, when it is determined that environmental air is polluted, the fan may not be operated even when a vehicle speed is within a speed range of fan influence, with the proviso that urbanization data indicates that a location of the vehicle is not in an area requiring air cleaning, e.g., in the country side. Thus, air cleaning in urban areas may be prioritized.

According to some embodiments, the system 100 may include or be configured to be installed with a heat radiator. For example, the heat radiator may be downstream from the filter 102. The system 100 may be configured to, before adjusting control parameters, check whether the changes in control parameters affect heat management, e.g., if a shutter is closed it may reduce air flow through the radiator. For example, if adjusting control parameters reduces heat extraction below a pre-determined threshold, the adjusting of the control parameters is not carried out, or the adjusted control parameters are not used. Alternatively, or in addition, adjusting control parameters may include adjusting bypass parameters for controlling airflow through the radiator to at least partially compensate for changes of airflow through the filter.

According to various embodiments, filter loading may be determined based on the information of pollutants in air and air speed (or flow or flux or another derived quantity) through the filter. Information of pollutants may be for example, in the form of weather data, air quality, and/or air temperature. The controlling circuit may obtain weather data, air quality, and/or air temperature by receiving the data from sensors integrated in (e.g., fixed to) the vehicle, for example upstream of the filter, one or more of the following may be measured: air temperature, air quality data. A rain sensor may also provide may provide rain information. Air quality data may include one or more of PM10 concentration, PM2.5 concentration, PM1 concentration, relative humidity, VOC concentration, NOX concentration. In various embodiments, air quality data may include at least one particulate matter concentration is measured. Alternatively, or in addition to obtaining data from the sensors of the vehicle, said data (or part thereof) may be obtained from a weather database that is external to the vehicle (e.g., via wireless communication), for example from a cloud. Such weather database may be a weather database, e.g., as it is provided by weather service providers. The wireless communication may be provided by the cellular infrastructure (3G, 4G, 5G, 6G and above), or WIFI, or another as explained further below.

According to various embodiments, the method may further include, determining 228 if the filter will achieve the pre-determined filter load at the next maintenance time, which may include a loading capacity tolerance, for example, a plus and minus tolerance chosen from a range of smaller or equal than 10% or smaller and equal than 5%, e.g., +/−10%, +/−7%. Alternatively or in addition, the tolerance may be on the next maintenance time, for example a plus and minus tolerance chosen from a range of smaller or equal than 15 days, smaller and equal than 10 days, or smaller and equal than 5 days, e.g., +/−10 days, +/−7 days. Alternatively or in addition, the tolerance may be on a mileage, for example a plus and minus tolerance chosen from a range of smaller or equal than 3000 km, smaller and equal than 1000 km, e.g., +/−1000 km.

Figure 7:
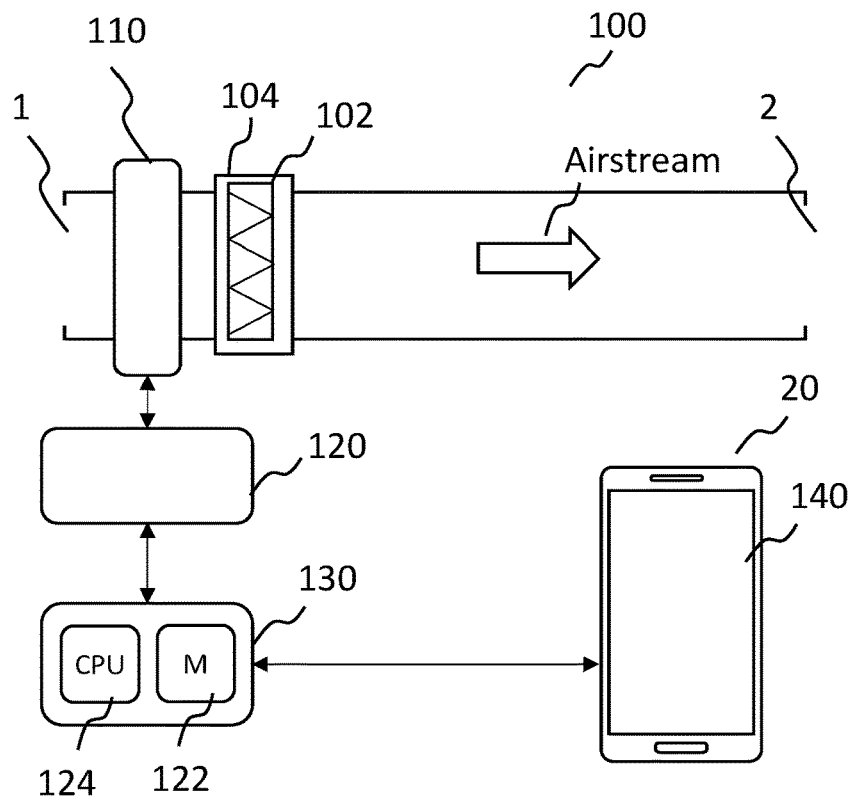
FIG. 7 shows a schematic of a system 100 for cleaning fluid in accordance with some embodiments.

FIG. 7 shows a schematic of a system 100 for cleaning fluid in accordance with some embodiments, wherein the electronic processing circuit 130 is operably couplable to a user interface (or user interface device) including a display 140 for displaying filter load information and buttons so that a user, based on the filter load information can request a change in the control parameters. The user interface and the display may be configured to displaying filter load information. The filter load information, may include, but is not limited to, on or more of: filter usage time, a filter loading time, a linearized filter loading time, remaining filter capacity time, filter load, load as mass, remaining filter load capacity, current life time, end-of-life time estimation, prediction of an end-of-life time. The buttons may be, for example, mechanical buttons, capacitive buttons, virtual screen buttons working with a touch interface. The user interface may be integrated in a mobile phone, e.g., a smartphone 20, or may be a display on a vehicle's dashboard. Communication between the electronic processing circuit 130 and the mobile phone may be, e.g., via WIFI, Bluetooth, via the internet (e.g., using the mobilephone communication infrastructure), or another means of wireless communication.

According to some embodiments, the electronic processing circuit 130 is operably couplable to a user interface (or user interface device) including an audio output interface (e.g., a speaker) for speaking filter load information and buttons so that a user, based on the filter load information can request a change in the control parameters. Alternatively or in addition to buttons, the interface may comprise a microphone. The user interface and the audio output interface may be configured to speaking filter load information. The filter load information, may include, but is not limited to, on or more of: filter usage time, a filter loading time, a linearized filter loading time, remaining filter capacity time, filter load, load as mass, remaining filter load capacity, current life time, end-of-life time estimation, prediction of an end-of-life time. The buttons may be, for example, mechanical buttons, capacitive buttons, virtual screen buttons working with a touch interface. The user interface may be integrated in a mobile phone, e.g., a smartphone 20, or may be a microphone on a vehicle's dashboard. Communication between the electronic processing circuit 130 and the mobile phone may be, e.g., via WIFI, Bluetooth, via the internet (e.g., using the mobile phone communication infrastructure), or another means of wireless communication.

According to some embodiments, the controlling circuit 120 and the electronic processing circuit 130 may be integrated in a single control unit, for example, in an engine control unit.

According to some embodiments, the controlling circuit 120 and the electronic processing circuit 130 may be physically separate from each other. The controlling circuit 120 may include or be connected to a data communication interface. The data communication interface may be configured to connect to a server, e.g., a cloud including the electronic processing circuit 130.

Figure 8:
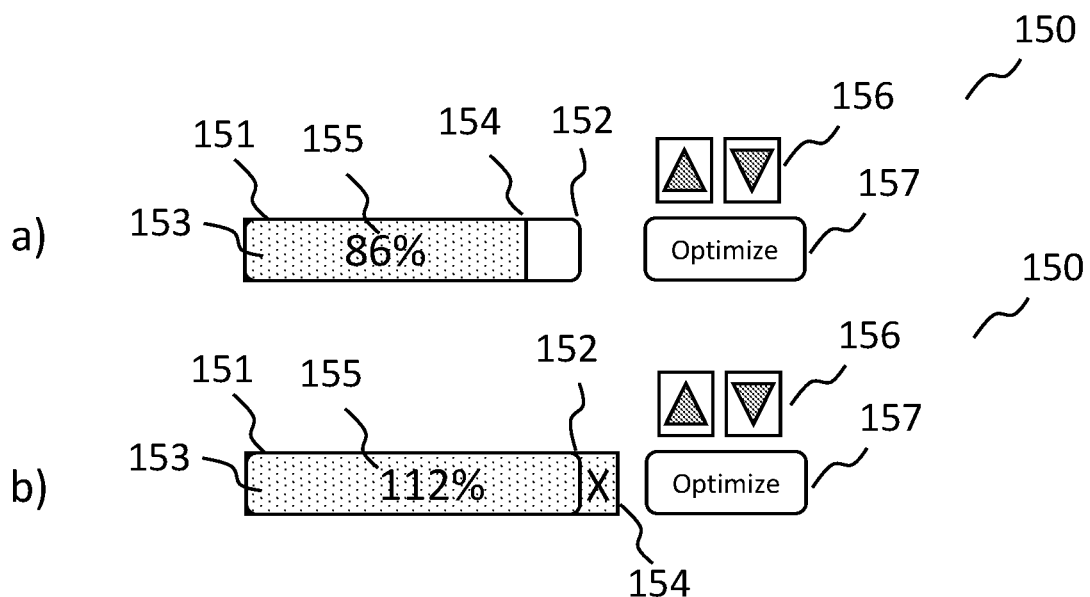
FIG. 8 shows an example of a user interface 150.

According to various embodiments, a filter load information may be displayed on the display. The filter load information may include one or more of the filter usage time, a filter loading time, a linearized filter loading time, remaining filter capacity time, filter load, remaining filter load capacity. FIG. 8 shows an example of a user interface configuration 150. The user interface 150 may include an indicator, such as a bar 153 over a rectangle 151. The rectangle 151 may represent the filter capacity and the right boundary 152 of the rectangle represents the full capacity which is ideally achieved at the next maintenance time. The shaded (dotted) area 153 indicates the estimated filter load at the next maintenance time. In a) it is shown that the estimated filter load at the next maintenance time will be 86% which may be represented by a text 155 or the bar 153 represented by the dotted area ending at 154, thus the filter has been underutilized since the lifetime of the filter will not be reached at the next maintenance time (14% are estimated to be not utilized). In b) it is shown another example, in which the estimated filter load at the next maintenance time will be 112% which may be represented by a text 155 or the bar 153 represented by the dotted area ending at 154, which not achievable as it is beyond the maximum filter capacity. Thus, the filter is being over utilized.

Based on this information on the estimated filter load and/or remaining capacity, a user can, e.g., via buttons 156, manually reduce or increase filter utilization. For example, user can click on one of the buttons and the method can recalculate the estimated load at the next maintenance time and show the bar 155 changing accordingly. Thus, the user can click and adjust the parameters until a desired estimated filter load (e.g., 100%) is achieved at the pre-determined next maintenance time. Alternatively or in addition, the user can click on button 157, which may be labelled as "optimize" for example, which may trigger the generation of adjusted control parameters in accordance with various embodiments. Other user interfaces are possible, for example, a current filter loading may be shown. The current disclosure has the objective to clean air. A proviso of a user interface in which the user can receive information on filter loading and/or estimated filter loading, and optionally set the filter usage to increase, decrease, and/or optimize usage leads to a better usage of the filter, since the user is more prone to increase usage of the filter if he is informed that the filter is underutilized and is given the option to change the control parameters to increase an average loading rate.

According to some embodiments, the method or system may allow a user may manually change, such as increase, decrease, or set a filter usage which may lead the filter to be overloaded (e.g., full nominal load is exceeded). In one case the filter may be overloaded within a next pre-determined time or distance (e.g., within the next 50 km or the next 30 minutes), or at the next maintenance time. The method or system may determining an estimated filter load at the next maintenance time (and/or a next pre-determined time or distance) based on the new control parameters associated with a manual user change of the filter usage, and comparing the estimated filter load with the pre-determined filter load. When the estimated filter load is above the pre-determined filter load (optionally equal or above) then the user may be issued a prompt (e.g., visual and/or audible) with a request to confirm the changed parameters. The method may include, determine if the user has not confirmed the changed parameters, and then revert or keep the previous operating conditions, e.g., previous parameters or previous optimization routines. This may be important for heat management of a vehicle, as a loaded filter may cause airflow blockage and overheating and damage of systems that need to be cooled. A loaded filter may also mean that ambient air filtration is decreased and net particulate emission of the vehicle may become above a pre-determined level, which may place the vehicle operation out of its pre-determined operational margins, thereby causing excessive ambient air pollution.

Figure 9:
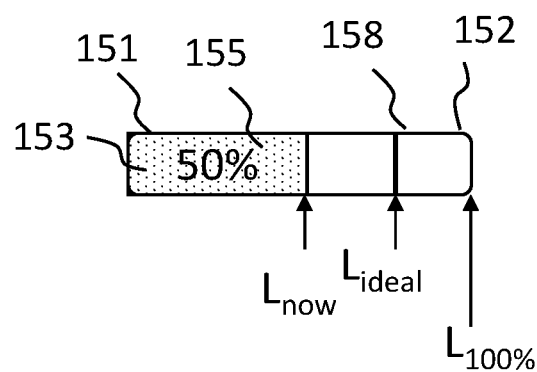
FIG. 9 shows an alternative representation of a bar 153 in a user interface.

FIG. 9 shows an alternative representation of the rectangle 151, wherein the shaded (dotted) bar 153 represents the current loading Lnow of the filter 102, and the right boundary 152 represents the full load of the filter L100%. A bar 158 may be used to represent the ideal filter loading Lideal at the present time so that the full load is achieved at the pre-determined next maintenance time. Here the user could interact with the buttons until Lnow=Lideal., for example by increasing filter usage, so that the estimation moves Lideal (the ideal filter loading at the present time for full load achievement at the pre-determined next maintenance time) until it matches Lnow.

Figure 10:
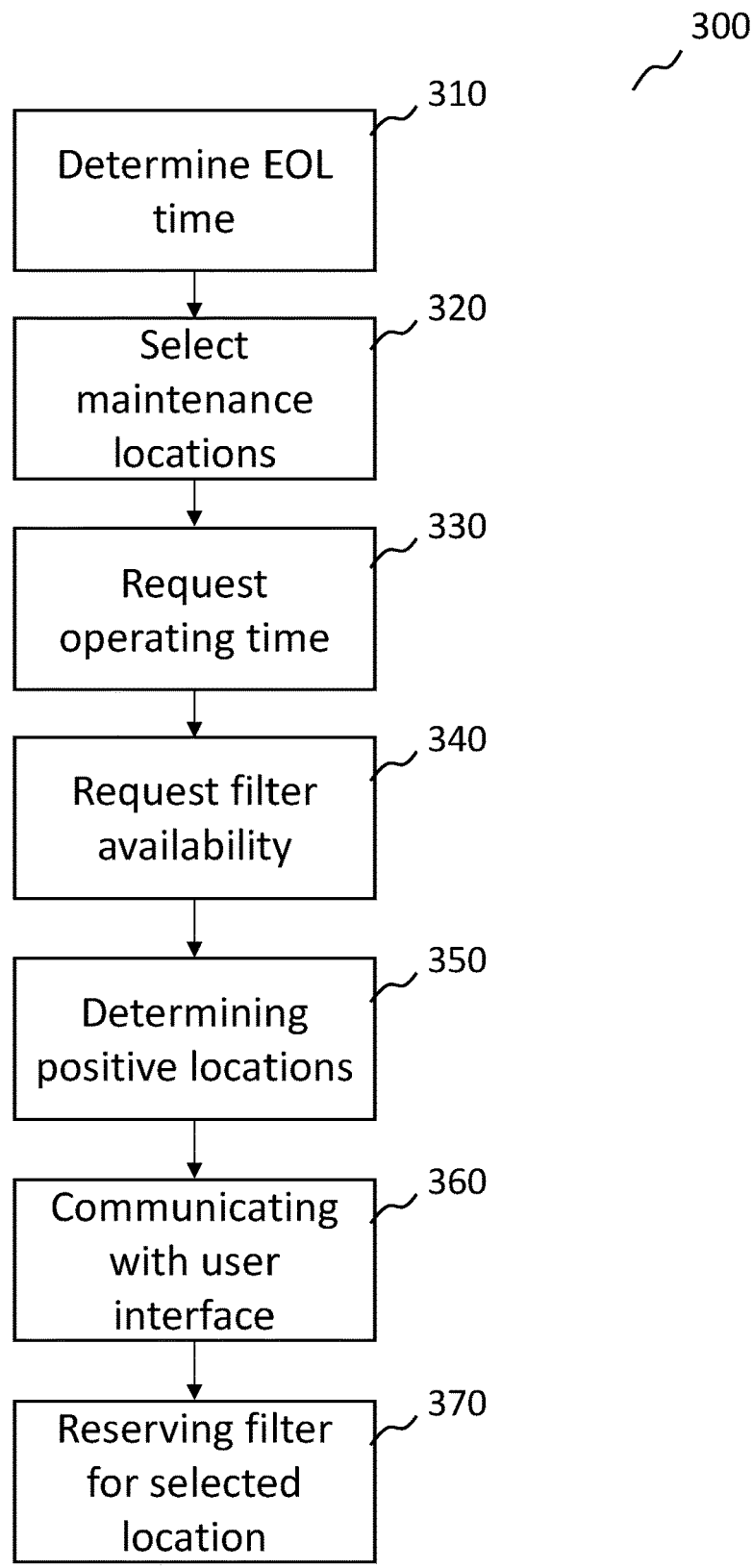
FIG. 10 shows a schematic flowchart for illustrating a method 300 of ordering a replacement filter.

FIG. 10 shows a schematic flowchart for illustrating a method 300 of ordering a replacement filter, which may be part of method 200 of cleaning fluid, or may be implemented separately from method 200. The method 300 may include, e.g. by the electronic processing circuit 130, determining 310 an end-of-life time of the filter 102. The method 300 may further include, selecting 320 one or more potential maintenance locations from a locations database. For example, the locations database may be stored in as a cache in a memory of the vehicle, and/or may be stored in a cloud service. The selection 320 may be according to pre-determined selections criteria, which may include, e.g., authorized workshops, workshops that have been used in the past by this user and/or by this vehicle, workshops that are within a pre-determined driving distance or driving time from a pre-determined location of the vehicle, driver and/or vehicle's owner home, which group may also be called a group of point of service location types. The maintenance location may also include locations that are not point of service, such as driver and/or vehicle's owner home (wherein the service is done somewhere else), or a postal station. Examples of a pre-determined location of the vehicle, may include, but are not limited to: a base location, a most commonly driving by location, a location within future routes planned for the vehicle, a combination thereof.

The method 300 may further include requesting 330 operating time data from the locations database. For example, for each location when is it open and/or when is it closed, including time for day of the week, public holidays, and/or other exceptional closures. Step 330 may be performed together with 320 or separately, or in reverse order.

The method 300 may further include requesting 340 availability of a replacement filter data from a service provider, e.g., location's server or from the locations database. Requesting 340 availability may include, e.g., sending a filter type, a filter specification, or a filter part number to the service provider, e.g, to a location's server or to the locations database and waiting for a response. The response may include availability of a replacement filter data, which may be data indicating, but not limited to, a number of replacement filters available, a date for which the replacement filter will be available, filter specifications, an indication that no replacement filter is available, or a combination thereof.

The method 300 may further include determining 350 one or more positive maintenance locations as being the one or more potential maintenance locations in which the replacement filter is available. Thus, for each location, it may be determined whether the location has operating times overlapping with the pre-determined next maintenance time, whether the location has a suitable replacement filter available, and if yes, then it may be added to the one or more potential maintenance locations in which the replacement filter is available.

The method 300 may further include providing 360 a message comprising the positive maintenance locations on a user interface, and receiving a user input for selecting a maintenance location. For example, the message may be visual, such as a list of locations which may further include information on, but not limited thereto: opening time, distance to current position, distance to base, driving time from current position, driving time from base, price of the filter, filter availability information. The display may also be in the form of a map. In another example, the information may be in the form of audio, e.g., the communication interface may say "Would you like to select workshop X by date Y for replacement?". A combination of two or all of above examples is also possible. The user may provide input by selecting a location and/or confirming a selection, e.g., by pressing a button on a display, pressing a button on a steering wheel, or verbally confirming by speaking, e.g., "Please select the closest location".

The method 300 may further include adding 370 filter reservation information to a database associated with the selected maintenance location, indicating that the filter is to be reserved. For example, a confirmation that a replacement filter is to be reserved may be added to a database of the workshop or associated with the workshop. Herein, filter availability may also be replaced by filter orderability, thereby the positive locations may include the one or more potential maintenance locations for which the filter replacement is orderable within the pre-determined tolerance associated with the end-of-life time of the filter. Thus the filter reservation information may include or be filter ordering information.

Steps 320 to 370 may be carried out in another order than shown, or may be combined in single steps, for example, steps 330 to 350 may be combined into a single enquiry. Steps 320 to 370 may be carried out by an ordering subsystem which may be part of the system 100. The ordering subsystem may be implemented on board (e.g., in electronic processing circuit 130) of the vehicle, on a cloud, or a combination thereof, for example, the steps 330 to 350 may be implemented in a cloud, and step 360 may be implemented on board (e.g., in electronic processing circuit 130) of the vehicle.

While some examples refer to a workshop, another type of location may be used instead or in combination. For example, the locations may include one or more of: a merchant, a supermarket, a post station, a fuel station.

Figure 11:
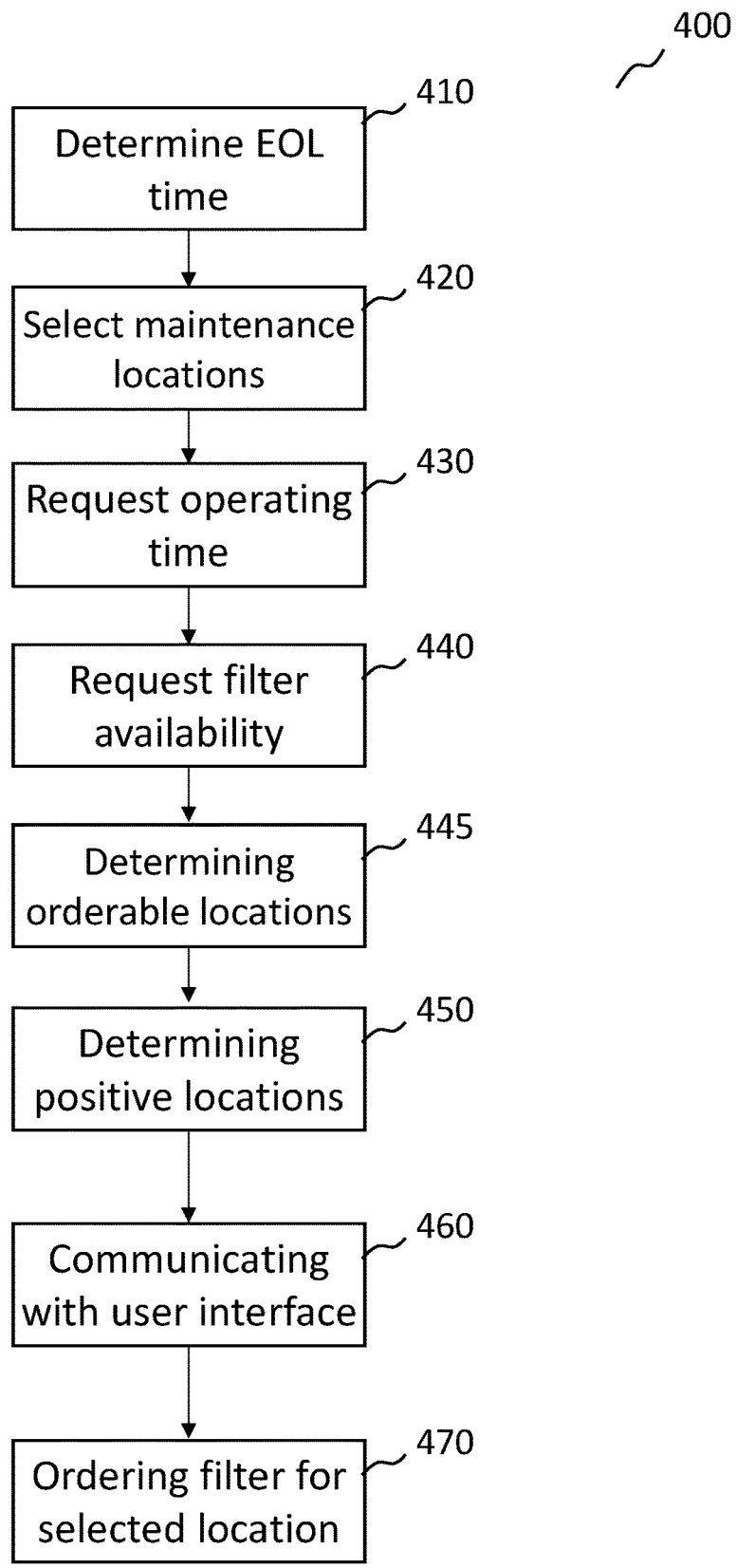
FIG. 11 shows a schematic flowchart for illustrating a method 400 of ordering a replacement filter.

FIG. 11 shows a schematic flowchart for illustrating a method 400 of ordering a replacement filter, which may be part of method 200 of cleaning fluid, or may be implemented separately from method 200. The method 400 may include, e.g. by the electronic processing circuit 130, determining 410 an end-of-life time of the filter. The method 400 may include, selecting 420 one or more potential maintenance locations from a locations database. For example, the locations database may be stored in as a cache in a memory of the vehicle, and/or may be stored in a cloud service. The selection 320 may be according to pre-determined selections criteria, which may include, e.g., authorized workshops, workshops that have been used in the past by this user and/or by this vehicle, workshops that are within a pre-determined driving distance or driving time from a pre-determined location of the vehicle. Examples of a pre-determined location of the vehicle, may include, but are not limited to: a base location, a most commonly driving by location, a location within future routs planned for the vehicle, a combination thereof.

The method 400 may further include requesting operating time data from the locations database. For example, for each location when is it open and/or when is it closed, including time for day of the week, public holidays, and/or other exceptional closures. Step 430 may be performed together with 420 or separately, or in reverse order.

The method 400 may further include requesting availability of a replacement filter data from a location's server or from the locations database. Requesting 440 availability may include, e.g., sending a filter type, a filter specification, or a filter part number to the service provider, e.g, to a location's server or to the locations database and waiting for a response. The response may include availability of a replacement filter data, which may be data indicating, but not limited to, a number of replacement filters available, a date for which the replacement filter will be available, filter specifications, an indication that no replacement filter is available, or a combination thereof.

The method 400 may further include determining 445 that there are potential maintenance locations in which the replacement filter is not available; estimating a delivery time for potential maintenance locations in which the replacement filter is not available according to a pre-determined historical database and/or stock data from a stock database.

The method 400 may further include determining 450 a set of one or more positive maintenance locations, including the one or more potential maintenance locations for which the filter replacement is orderable within the pre-determined tolerance associated with the end-of-life time of the filter.

The method 400 may further include providing a message 460 comprising the positive maintenance locations on a user interface, and receiving a user input for selecting a maintenance location. For example, the message may be visual, such as a list of locations which may further include information on, but not limited thereto: opening time, distance to current position, distance to base, driving time from current position, driving time from base, price of the filter, filter availability information, filter orderability information. The display may also be in the form of a map. In another example, the information may be in the form of audio, e.g., the communication interface may say "Would you like to select workshop X by date Y for replacement?". A combination of two or all of above examples is also possible. The user may provide input by selecting a location and/or confirming a selection, e.g., by pressing a button on a display, pressing a button on a steering wheel, or verbally confirming by speaking, e.g., "Please select the closest location".

The method 400 may further include ordering 470 the filter to the maintenance location, by preparing an order dataset for an order of the replacement filter for replacing filter 102 including replacement filter model and the pre-determined next maintenance time; and sending the order data to an order receiver communication interface. The method 400 may further include use an estimate delivery time added by the pre-determined tolerance as the pre-determined next maintenance time.

Methods 300 and 400 may be combined, e.g., to account for locations in which the replacement filter is available and/or locations for which the replacement filter is orderable.

Steps 420 to 470 may be carried out in another order than shown, or may be combined in single steps, for example, steps 430 to 450 may be combined into a single enquiry. Steps 420 to 470 may be carried out by an ordering subsystem which may be part of the system 100. The ordering subsystem may be implemented on board (e.g., in electronic processing circuit 130) of the vehicle, on a cloud, or a combination thereof, for example, the steps 430 to 450 may be implemented in a cloud, and step 460 may be implemented on board (e.g., in electronic processing circuit 130) of the vehicle.

While some examples refer to a workshop, another type of location may be used instead or in combination. For example, the locations may include one or more of: a merchant, a supermarket, a post station, a fuel station.

The system 100 for cleaning fluid may be configured to carry out any of the methods described herein, for example, method 300 and/or method 400.

In some embodiments of a system 100 for cleaning fluid in accordance with various embodiments, the electronic processing circuit 130 may be configured to determine an end-of-life time of the filter. The system may further include an ordering subsystem configured to select one or more potential maintenance locations from a locations database; request operating time data from the locations database; and request availability of a replacement filter data from a location's server or from the locations database.

According to various embodiments, the system may further include an ordering subsystem configured to determine whether there are potential maintenance locations in which the replacement filter is not available; estimate a delivery time for potential maintenance locations in which the replacement filter is not available according to a pre-determined historical database and/or stock data from a stock database; and determine a set of one or more positive maintenance locations. The set of one or more positive maintenance locations may include the one or more potential maintenance locations for which the filter replacement is available, and may further include the one or more potential maintenance locations for which the filter replacement is orderable within the pre-determined tolerance associated with the end-of-life time of the filter.

According to various embodiments, the ordering subsystem may be further configured to provide a message comprising the positive maintenance locations on a user interface, and receive a user input for selecting a maintenance location, e.g., as described above in connection to method 300.

According to various embodiments, the ordering subsystem may be further configured to if the maintenance location selected by the user is one of the one or more potential maintenance locations for which the filter replacement is orderable: order the filter to the maintenance location, by preparing an order dataset for an order of the replacement filter for replacing filter 102 including replacement filter model and the pre-determined next maintenance time; sending the order data to an order receiver communication interface; and use the estimate delivery time added by the pre-determined tolerance as the pre-determined next maintenance time.

According to some embodiments, the method of cleaning fluid of any one of the previous claims, may include, by the electronic processing circuit 130, determining an end-of-life time of the filter. The method may further include, e.g. by an ordering subsystem of the system 100, selecting one or more potential suppliers from a suppliers database. The method may further include, e.g. by an ordering subsystem of the system 100, requesting operating time data from the suppliers database. The method may further include, e.g. by an ordering subsystem of the system 100, requesting availability of a replacement filter data from a supplier's server or from the suppliers database. The method may further include, e.g. by an ordering subsystem of the system 100, estimating a delivering time for potential according to a pre-determined historical database and/or stock data from a stock database. The method may further include, e.g. by an ordering subsystem of the system 100, determining a set of one or more positive suppliers, comprising the one or more potential suppliers for which the filter replacement is orderable within the tolerance of the end-of-life time of the filter. The method may further include, e.g. by an ordering subsystem of the system 100, providing a message comprising the positive suppliers on a user interface and receiving a user input for selecting a supplier. The method may further include, e.g. by an ordering subsystem of the system 100, ordering the filter to a predetermined user location, by preparing an order datapacket for an order of the replacement filter for the replacing filter 102, the order datapacket comprising replacement filter model and the pre-determined next maintenance time; and sending the order data to an order receiver communication interface; and use the delivering time added by the pre-determined tolerance as the pre-determined next maintenance time. More details of above method steps are not repeated herein for conciseness and are already explained in connection with methods 300 and 400.

According to various embodiments, the electronic processing circuit 130 may be configured to determine an end-of-life time of the filter, and provide a specification data packet including at least data indicative of the kind of filter and a type of vehicle. The system 100 may further include an ordering subsystem configured to receive the specification data packet. The ordering subsystem may be configured to select one or more potential suppliers from a suppliers database and request availability of a replacement filter data from a supplier's server or from the suppliers database. The ordering subsystem may be configured to determine a set of one or more positive suppliers, comprising the one or more potential suppliers for which the filter replacement is orderable. The ordering subsystem may be configured to provide a message comprising the positive suppliers on a user interface, and receive a user input for selecting a supplier. The ordering subsystem may be configured to order the filter to a user's predefined address, by preparing an order datapacket for an order of the replacement filter for replacing filter 102, the order datapacket comprising replacement filter model and the pre-determined next maintenance time; and sending the order data to an order receiver communication interface (e.g. of the selected supplier). The ordering subsystem may be configured to use the estimate delivery time added by the pre-determined tolerance as the pre-determined next maintenance time, thus replacing the previous next maintenance time.

Some embodiments related to a vehicle connected to the system 100 for cleaning fluid. The vehicle may include the air channel comprising an intake 1 and an outlet 2, for example the air channel may include a duct, or more than one duct parts, coupled to the receptacle 104. The vehicle may include the receptacle 104 configured to receive a filter 102, so that the filter 102 when installed in the receptacle 104 is in the stream of an airflow when air is flowing through the air channel. The vehicle may include the airflow control device 110 for influencing a filter airflow which is portion of the airflow that passes the filter, for example the air flow system may include a shutter, a filter bypass, a fan, or two or more thereof. In one example, the vehicle may include a shutter upstream from the filter 102, a bypass parallel to the filter, and/or a fan downstream of the filter 102. The vehicle may further include the controlling circuit 120 for controlling the airflow control device in accordance with pre-determined control parameters. The vehicle may include: the air channel, the receptacle 104, the airflow control device 110, and the controlling circuit 120. The vehicle may further include the electronic processing circuit 130 and/or operably coupled to the electronic processing circuit 130, e.g., as an edge processing unit or a server processing unit.

Figure 12:
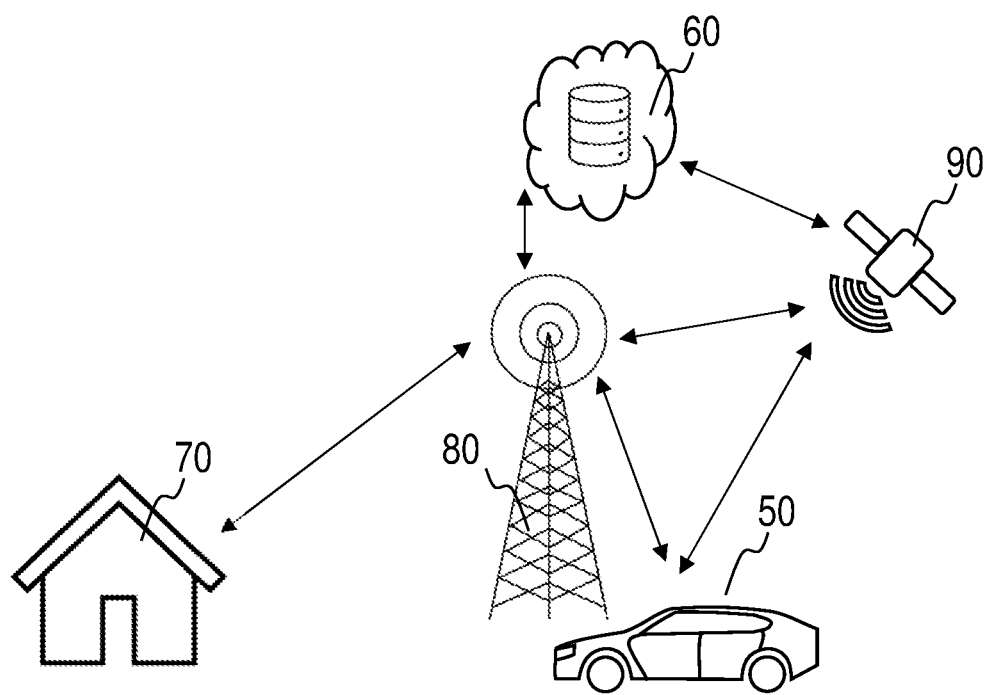
FIG. 12 shows a schematic to illustrate possible forms of communication between the system components of a vehicle 50 and system elements and other elements external to the vehicle 50.

FIG. 12 shows a schematic to illustrate possible forms of communication between the system components of a vehicle 50 and system elements and other elements external to the vehicle 50. The vehicle 50 may communicate with external services wirelessly via the controlling circuit 120 or the electronic processing circuit 130, and to cloud services and/or a location, e.g. a workshop 70, via existing infrastructure, such as mobile phone telecommunication infrastructure 80, satellite communication 80, and/or the internet.

According to various embodiments, wireless communication may be provided by one or more of may operate according to any one or more of the following radio communication technologies and/or standards including but not limited to: Global System for Mobile Communications (GSM) radio communication technology, General Packet Radio Service (GPRS) radio communication technology, Third Generation Partnership Project (3GPP) radio communication technology, Universal Mobile Telecommunications System (UMTS), Freedom of Multimedia Access (FOMA), 3GPP Long Term Evolution (LTE), Code division multiple access 2000 (CDM2000), Cellular Digital Packet Data (CDPD), Mobitex, Wideband Code Division Multiple Access (Universal Mobile Telecommunications System) (W-CDMA (UMTS)), High Speed Packet Access (HSPA), High Speed Packet Access Plus (HSPA+), Time Division-Code Division Multiple Access (TD-CDMA), High capacity version of NTT (Nippon Telegraph and Telephone) (Hicap), Cellular Digital Packet Data (CDPD), Wideband Integrated Digital Enhanced Network (WiDEN), iBurst, Unlicensed Mobile Access (UMA), also referred to as 3GPP Generic Access Network, or GAN standard, Bluetooth(r), Bluetooth Low Energy (BLE), IEEE 802.15.4 based protocols (e.g., IPv6 over Low power Wireless Personal Area Networks (6LoWPAN), WirelessHART, MiWi, Thread, 802.11a) WiFi-direct, ANT/ANT+, ZigBee, Z-Wave, 3GPP device-to-device (D2D) or Proximity Services (ProSe), Low-Power Wide-Area-Network (LPWAN), Long Range Wide Area Network (LoRA) or LoRaWAN™ developed by Semtech and the LoRa Alliance, Sigfox, Wireless Gigabit Alliance (WiGig) standard, mmWave standards in general (wireless systems operating at 10-300 GHz and above such as WiGig, IEEE 802.11ad, IEEE 802.11 ay), technologies operating above 300 GHz and THz bands, (3GPP/LTE based or IEEE 802.11p and other) V2X communication technologies, 3GPP cellular V2X, DSRC (Dedicated Short Range Communications) communication systems such as Intelligent-Transport-Systems and others, the European ITS-G5 system (i.e. the European implementation of IEEE 802.11p based DSRC, including ITS-G5A, ITS-G5B, ITS-G5C). In addition to the radio communication technologies and/or standards listed above, any number of satellite uplink technologies may be used including, for example, radios compliant with standards issued by the ITU (International Telecommunication Union), or the ETSI (European Telecommunications Standards Institute), Starlink™ among others. The embodiments provided herein are thus understood as being applicable to various other communication technologies, both existing and not yet formulated.

According to various embodiments, the vehicle may be a human driven our autonomous motor-powered vehicle, for example having 2, 3, 4, or more wheels. Examples of the vehicle are passenger car, truck, buss, lorry, or a rail vehicle, for example a locomotive. The vehicle may include an air inlet opening in a front region, upstream from the system, for allowing air ingress and an air outlet, downstream from the system, for allowing air egress. The air inlet opening behind which the ambient air cleaning device is present may in particular be a cooling air inlet opening and may for example be covered by a grille. For example, this may be at the same level as the front headlights with respect to the vertical axis of the vehicle, or may be located below or above them. In other examples the air ingress and an air outlet may be located at or proximal to an underside of the vehicle. In another example, the system may be installed on the top of the vehicle, and therefore the air ingress and an air outlet may be located at or proximal to a top of the vehicle. The cross-sectional area of the air intake opening may be as large as possible so that the largest possible volume of air can be supplied. In some embodiments, the vehicle may be an electric vehicle or a hybrid (internal combustion engine and electrical) vehicle. In some embodiments, the vehicle may be an internal combustion engine (ICE) vehicle (i.e., non-hybrid). For example, such battery of an ICE vehicle may have a relatively large capacity and may operate the fan for a long time (e.g., 1 h) without significant drain even if it is not being charge by an alternator. In some embodiments, the vehicle comprises an internal combustion engine and a cooling fluid temperature (from the hot side) may be used as representation of the engine temperature. In some embodiments, the vehicle comprises a fuel cell and a cooling fluid temperature (from the hot side) may be used as representation of the fuel cell temperature.

The invention claimed is:

1. An air filter system comprising:
   an air filter;
   an air channel in fluid communication with the air filter and comprising an intake and an outlet;
   a receptacle configured to receive the air filter in an airflow when air is flowing through the air channel;
   an airflow control device operable for controlling the airflow through the air filter within the receptacle; and
   a controlling circuit for controlling the airflow control device in accordance with a pre-determined average loading rate of the air filter;
   an electronic processing circuit configured to:
      determine a filter usage value of the air filter and store the filter usage value to a historical data in a memory; and
      by a microprocessor and based on the historical data, generate an adjusted average loading rate of the air filter for the controlling circuit to control the airflow control device,
   wherein the adjusted average loading rate of the air filter reduces or increases a current average loading rate of the air filter such that a pre-determined filter load is achieved within a pre-determined tolerance of a pre-determined next maintenance time;
   wherein the electronic processing circuit is further configured to determine an end-of-life time of the air filter based on the historical data and compare the end-of-life time to the pre-determined next maintenance time; and
   wherein the electronic processing circuit is further configured to determine, based on the historical data, a reduction in the average loading rate of the air filter when the end-of-life time is before the pre-determined next maintenance time, or alternatively, to determine, based on the historical data, an increase in the average loading rate of the air filter when the end-of-life time is after the pre-determined next maintenance time, such that the end-of-life time occurs within the pre-determined tolerance of the pre-determined next maintenance time.

2. The air filter system of claim 1, wherein the filter usage value is a filter loading of the air filter, and
   wherein the electronic processing circuit determines the filter usage value and stores the historical data in the memory by:
      determining the filter loading of the air filter based on usage data and/or sensor data, and
      storing the filter loading of the air filter to the historical data in the memory.

3. The air filter system of claim 1, wherein the electronic processing circuit is further configured to, in an automatic mode, provide the adjusted average loading rate of the air filter to the controlling circuit for controlling the airflow control device.

4. The air filter system of claim 3, further comprising a setup unit configured to receive a mode data indicative of the automatic mode from a user selection carried out on a user interface and store the mode data in the memory for use by the electronic processing circuit.

5. The air filter system of claim 1, wherein the electronic processing circuit is further configured to determine, based on the historical data, a reduction in a filter usage of the air filter, such as a decreased airflow through the air filter, necessary to adjust the filter usage of the air filter such that the end-of-life time occurs within the pre-determined tolerance of the pre-determined next maintenance time.

6. The air filter system of claim 1, wherein the electronic processing circuit is further configured to determine, based on the historical data, an increase in a filter usage of the air filter, such as an increased airflow through the air filter, necessary to adjust the filter usage of the filter such that the end-of-life time occurs within the pre-determined tolerance of the pre-determined next maintenance time.

7. The air filter system of claim 1, wherein the electronic processing circuit is operably coupled to a user interface including a display for displaying a current filter load and an input to enable a user, based on the current filter load, to adjust the current average loading rate of the air filter.

8. The air filter system of claim 7, wherein a filter load information is displayed on the display and comprises at least one of a filter usage time, a filter loading time, a remaining filter capacity time, the current filter load, and a remaining filter load capacity.

9. The air filter system of claim 1, wherein the controlling circuit and the electronic processing circuit are integrated in a single control unit.

10. The air filter system of claim 1,
    wherein the controlling circuit and the electronic processing circuit are physically separate from each other,
    wherein the controlling circuit comprises or is connected to a data communication interface, and
    wherein the data communication interface is configured to connect to a server.

11. The air filter system of claim 1,
    wherein the electronic processing circuit further comprises an ordering subsystem configured to:
       select one or more potential maintenance locations from a locations database; and
       determine an availability of a replacement air filter from the one or more potential maintenance locations; and
       provide a message comprising the availability of the replacement air filter from the one or more potential maintenance locations on a user interface.

12. The air filter system of claim 11, wherein the electronic processing circuit is further configured to:
    provide a specification data packet including at least data indicative of a type of the air filter and a type of a vehicle, and
    wherein the ordering subsystem is further configured to:
       receive the specification data packet;
       select one or more potential suppliers from a suppliers database;
       determine an availability of a replacement air filter from the one or more potential suppliers; and
       provide a message comprising the availability of the replacement air filter from the one or more suppliers on the user interface.

13. A vehicle operably connected to the air filter system of claim 1, the vehicle comprising the air channel, the receptacle, the airflow control device, and the controlling circuit,
    wherein the vehicle further comprises the electronic processing circuit and/or is operably coupled to the electronic processing circuit.

14. A method of cleaning an airflow with an air filter, the method comprising:
    providing the airflow through the air filter;

by an airflow control device, controlling the airflow through the air filter;

by a controlling circuit, controlling the airflow control device in accordance with a pre-determined average loading rate of the air filter;

by an electronic processing circuit, determining a filter usage value of the air filter and storing the filter usage value to a historical data in a memory; and by a microprocessor, generating, based on the historical data, an adjusted average loading rate of the air filter for the controlling circuit to control the airflow control device, wherein the adjusted average loading rate of the air filter is different from the pre-determined average loading rate of the air filter, wherein the adjusted average loading rate of the air filter reduces or increases a current average loading rate of the air filter such that a pre-determined filter load is achieved within a pre-determined tolerance of a pre-determined next maintenance time;

wherein the electronic processing circuit further determines an end-of-life time of the air filter based on the historical data and compares the end-of-life time to the pre-determined next maintenance time; and wherein the electronic processing circuit further determines, based on the historical data, a reduction in the average loading rate of the air filter when the end-of-life time is before the pre-determined next maintenance time, or alternatively, determines, based on the historical data, an increase in the average loading rate of the air filter when the end-of-life time is after the pre-determined next maintenance time, such that the end-of-life time occurs within the pre-determined tolerance of the pre-determined next maintenance time.

15. The method of cleaning an airflow with an air filter of claim 14, further comprising:
by an ordering subsystem of the electronic processing circuit:
selecting one or more potential maintenance locations from a locations database;
determining an availability of a replacement air filter from the one or more potential maintenance locations; and
providing a message on a user interface comprising the one or more potential maintenance locations and the availability of the replacement air filter from the one or more potential maintenance locations.

16. The method of cleaning an airflow with an air filter of claim 14, further comprising:
by an ordering subsystem of the electronic processing circuit:
selecting one or more potential maintenance locations from a locations database;
determining an availability of a replacement air filter from the one or more potential maintenance locations;
determining that there are one or more potential maintenance locations from which the replacement air filter is not available and estimating a delivery time for the one or more potential maintenance locations from which the replacement air filter is not available;
providing a message on a user interface comprising the one or more potential maintenance locations from which the replacement air filter is not available and the estimated delivery time for the one or more potential maintenance locations from which the replacement air filter is not available; and
using the estimated delivery time added by the pre-determined tolerance as the pre-determined next maintenance time.

17. The method of cleaning an airflow with an air filter of claim 14, further comprising:
by an ordering subsystem of the electronic processing circuit:
selecting one or more potential suppliers from a suppliers database;
determining an availability of a replacement air filter from the one or more potential suppliers;
estimating a delivering time for the replacement air filter from the one or more potential suppliers; and
providing a message on a user interface comprising the one or more potential suppliers, the availability of the replacement air filter from the one or more potential suppliers, and the estimated delivering time for the replacement air filter from the one or more potential suppliers.

18. The method of cleaning an airflow with an air filter of claim 17, further comprising:
using the estimated delivering time added by the pre-determined tolerance as the pre-determined next maintenance time.

19. A computer program product comprising instructions that, when the program is executed by a microprocessing system, causes the microprocessing system to perform the method of claim 14.

20. A computer program product comprising a computer readable media comprising instructions that, when the program is executed by a microprocessing system, causes the microprocessing system to perform the method of claim 14.

21. An air filter system comprising:
an air filter;
an air channel in fluid communication with the air filter and comprising an intake and an outlet;
a receptacle configured to receive the air filter in an airflow when air is flowing through the air channel;
an airflow control device operable for controlling the airflow through the air filter within the receptacle;
a controlling circuit for controlling the airflow control device in accordance with a pre-determined average loading rate of the air filter; and
an electronic processing circuit configured to:
determine a filter usage value of the air filter and store the filter usage value to a historical data in a memory; and
by a microprocessor and based on the historical data, generate an adjusted average loading rate of the air filter for the controlling circuit to control the airflow control device,
wherein the adjusted average loading rate of the air filter reduces or increases a current average loading rate of the air filter such that a pre-determined filter load is achieved within a pre-determined tolerance of a pre-determined next maintenance time, and
wherein the electronic processing circuit is operably coupled to a user interface including a display for displaying a current filter load and an input to enable a user, based on the current filter load, to adjust the current average loading rate of the air filter.

* * * * *